US010812130B2

(12) United States Patent
Talla et al.

(10) Patent No.: US 10,812,130 B2
(45) Date of Patent: Oct. 20, 2020

(54) BACKSCATTER SYSTEMS, DEVICES, AND TECHNIQUES UTILIZING CSS MODULATION AND/OR HIGHER ORDER HARMONIC CANCELLATION

(71) Applicant: University of Washington, Seattle, WA (US)

(72) Inventors: Vamsi Talla, Seattle, WA (US); Mehrdad Hessar, Seattle, WA (US); Joshua R. Smith, Seattle, WA (US); Shyamnath Gollakota, Seattle, WA (US); Ali Najafi, Seattle, WA (US); Bryce Kellogg, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 16/343,088

(22) PCT Filed: Oct. 18, 2017

(86) PCT No.: PCT/US2017/057207
§ 371 (c)(1),
(2) Date: Apr. 18, 2019

(87) PCT Pub. No.: WO2018/075653
PCT Pub. Date: Apr. 26, 2018

(65) Prior Publication Data
US 2020/0052734 A1 Feb. 13, 2020

Related U.S. Application Data

(60) Provisional application No. 62/465,977, filed on Mar. 2, 2017, provisional application No. 62/409,705, filed on Oct. 18, 2016.

(51) Int. Cl.
H04B 1/69 (2011.01)
H04B 1/10 (2006.01)
(Continued)

(52) U.S. Cl.
CPC ............ *H04B 1/69* (2013.01); *H04B 1/1081* (2013.01); *H04B 1/7143* (2013.01);
(Continued)

(58) Field of Classification Search
CPC ...... H04B 1/69; H04B 1/1081; H04B 1/7143; H04B 2215/067; H04B 2001/6912; H04L 5/1461
See application file for complete search history.

(56) References Cited

U.S. PATENT DOCUMENTS 4,298,280 A 11/1981 Harney
4,916,460 A 4/1990 Powell
(Continued)

FOREIGN PATENT DOCUMENTS

CN 202713631 U 1/2013
EP 2975814 A1 1/2016
(Continued)

OTHER PUBLICATIONS

US 10,187,177 B2, 01/2019, Gollakota et al. (withdrawn)
(Continued)

*Primary Examiner* — Jean B Corrielus
(74) *Attorney, Agent, or Firm* — Dorsey & Whitney LLP

(57) ABSTRACT

Examples of backscatter systems, device, and techniques are described herein. Example backscatter devices may utilize CSS modulation to provide backscatter signals including CSS signals (e.g., LoRa packets). Utilizing CSS modulation may advantageously allow for backscatter communication over wide areas. Examples of backscatter devices described herein may toggle the impedance of the backscatter device between multiple (e.g., eight) impedances to reduce and/or eliminate higher order harmonic components in the backscatter signal (e.g., third and fifth harmonic components).

22 Claims, 8 Drawing Sheets

(51) Int. Cl.
*H04B 1/7143* (2011.01)
*H04L 5/14* (2006.01)

(52) U.S. Cl.
CPC .... *H04L 5/1461* (2013.01); *H04B 2001/6912* (2013.01); *H04B 2215/067* (2013.01)

(56) References Cited

U.S. PATENT DOCUMENTS

| | | | |
|---|---|---|---|
| 5,164,985 A * | 11/1992 | Nysen | H04B 1/54 380/271 |
| 5,220,330 A | 6/1993 | Salvail et al. | |
| 5,321,599 A | 6/1994 | Tanamachi et al. | |
| 5,649,296 A | 7/1997 | Maclellan et al. | |
| 5,663,710 A | 9/1997 | Fasig et al. | |
| 5,784,686 A | 7/1998 | Wu et al. | |
| 5,873,025 A | 2/1999 | Evans et al. | |
| 5,995,040 A | 11/1999 | Issler et al. | |
| 6,016,056 A | 1/2000 | Seki | |
| 6,084,530 A | 7/2000 | Pidwerbetsky et al. | |
| 6,094,450 A | 7/2000 | Shockey | |
| 6,107,910 A * | 8/2000 | Nysen | G01S 13/755 340/10.1 |
| 6,243,012 B1 | 6/2001 | Shober et al. | |
| 6,259,408 B1 | 7/2001 | Brady et al. | |
| 6,297,696 B1 | 10/2001 | Abdollahian et al. | |
| 6,611,224 B1 | 8/2003 | Nysen et al. | |
| 6,745,008 B1 | 6/2004 | Carrender et al. | |
| 6,765,476 B2 | 7/2004 | Steele et al. | |
| 6,838,989 B1 | 1/2005 | Mays et al. | |
| 6,870,460 B2 | 3/2005 | Turner et al. | |
| 6,970,089 B2 | 11/2005 | Carrender | |
| 7,107,070 B2 | 9/2006 | Auffret et al. | |
| 7,180,402 B2 | 2/2007 | Carrender et al. | |
| 7,215,976 B2 | 5/2007 | Brideglall | |
| 7,358,848 B2 | 4/2008 | Mohamadi | |
| 7,469,013 B1 | 12/2008 | Bolt et al. | |
| 7,535,360 B2 | 5/2009 | Barink et al. | |
| 7,796,016 B2 | 9/2010 | Fukuda | |
| 7,839,283 B2 | 11/2010 | Mohamadi et al. | |
| 7,961,093 B2 | 6/2011 | Chiao et al. | |
| 7,995,685 B2 | 8/2011 | Wang et al. | |
| 8,026,839 B2 | 9/2011 | Weber | |
| 8,120,465 B2 | 2/2012 | Drucker | |
| 8,170,485 B2 | 5/2012 | Hulvey | |
| 8,248,263 B2 | 8/2012 | Shervey et al. | |
| 8,284,032 B2 | 10/2012 | Lee et al. | |
| 8,391,824 B2 | 3/2013 | Kawaguchi | |
| 8,526,349 B2 | 9/2013 | Fischer | |
| 8,797,146 B2 | 8/2014 | Cook et al. | |
| 8,952,789 B2 | 2/2015 | Dardari | |
| 8,971,704 B2 | 3/2015 | Cavaliere et al. | |
| 9,252,834 B2 | 2/2016 | Seller et al. | |
| 9,312,950 B1 | 4/2016 | Deyle | |
| 9,357,341 B2 | 5/2016 | Deyle | |
| 9,680,520 B2 | 6/2017 | Gollakota et al. | |
| 9,973,367 B2 | 5/2018 | Gollakota et al. | |
| 10,033,424 B2 | 7/2018 | Gollakota et al. | |
| 10,079,616 B2 | 9/2018 | Reynolds et al. | |
| 10,270,639 B2 | 4/2019 | Gollakota et al. | |
| 2002/0015436 A1 | 2/2002 | Ovard et al. | |
| 2003/0043949 A1 | 3/2003 | O'Toole et al. | |
| 2003/0133495 A1 | 7/2003 | Lerner et al. | |
| 2003/0174672 A1 | 9/2003 | Herrmann | |
| 2004/0005863 A1 | 1/2004 | Carrender | |
| 2004/0210611 A1 | 10/2004 | Gradishar et al. | |
| 2005/0053024 A1 | 3/2005 | Friedrich | |
| 2005/0099269 A1 | 5/2005 | Diorio et al. | |
| 2005/0201450 A1 | 9/2005 | Volpi et al. | |
| 2005/0248438 A1 | 11/2005 | Hughes et al. | |
| 2005/0253688 A1 | 11/2005 | Fukuda | |
| 2005/0265300 A1 | 12/2005 | Rensburg | |
| 2006/0044147 A1 | 3/2006 | Knox et al. | |
| 2006/0045219 A1 | 3/2006 | Wang et al. | |
| 2006/0082458 A1 | 4/2006 | Shanks et al. | |
| 2006/0087406 A1 | 4/2006 | Willins et al. | |
| 2006/0109127 A1 | 5/2006 | Barink et al. | |
| 2006/0220794 A1 | 10/2006 | Zhu | |
| 2006/0236203 A1 | 10/2006 | Diorio et al. | |
| 2006/0261952 A1 | 11/2006 | Kavounas et al. | |
| 2007/0018904 A1 | 1/2007 | Smith | |
| 2007/0046434 A1 | 3/2007 | Chakraborty | |
| 2007/0069864 A1 | 3/2007 | Bae et al. | |
| 2007/0096876 A1 | 5/2007 | Bridgelall et al. | |
| 2007/0109121 A1 | 5/2007 | Cohen | |
| 2007/0111676 A1 | 5/2007 | Trachewsky et al. | |
| 2007/0115950 A1 | 5/2007 | Karaoguz et al. | |
| 2007/0201786 A1 | 8/2007 | Wuilpart | |
| 2007/0210923 A1 | 9/2007 | Butler et al. | |
| 2007/0285245 A1 | 12/2007 | Djuric et al. | |
| 2007/0293163 A1 | 12/2007 | Kilpatrick | |
| 2008/0068174 A1 | 3/2008 | Al-mahdawi | |
| 2008/0131133 A1 | 6/2008 | Blunt et al. | |
| 2008/0136646 A1 | 6/2008 | Friedrich | |
| 2008/0165007 A1 | 7/2008 | Drago et al. | |
| 2008/0180253 A1 | 7/2008 | Ovard et al. | |
| 2008/0207357 A1 | 8/2008 | Savarese et al. | |
| 2008/0211636 A1 | 9/2008 | O'Toole et al. | |
| 2008/0216567 A1 | 9/2008 | Breed | |
| 2008/0225932 A1 | 9/2008 | Fukuda | |
| 2008/0252442 A1 | 10/2008 | Mohamadi et al. | |
| 2008/0278293 A1 | 11/2008 | Drucker | |
| 2009/0099761 A1 | 4/2009 | Davis et al. | |
| 2009/0189981 A1 | 7/2009 | Siann et al. | |
| 2009/0201134 A1 | 8/2009 | Rofougaran | |
| 2009/0243804 A1 | 10/2009 | Fukuda | |
| 2009/0252178 A1 | 10/2009 | Huttunen et al. | |
| 2010/0156651 A1 | 6/2010 | Broer | |
| 2010/0271188 A1 | 10/2010 | Nysen | |
| 2011/0053178 A1 | 3/2011 | Yang | |
| 2011/0069777 A1 | 3/2011 | Hurwitz et al. | |
| 2011/0080267 A1 | 4/2011 | Clare et al. | |
| 2011/0260839 A1 | 10/2011 | Cook et al. | |
| 2012/0001732 A1 | 1/2012 | Kawaguchi | |
| 2012/0002766 A1 | 1/2012 | Kawaguchi | |
| 2012/0051411 A1 | 3/2012 | Duron et al. | |
| 2012/0099566 A1 | 4/2012 | Laine et al. | |
| 2012/0112885 A1 | 5/2012 | Drucker | |
| 2012/0245444 A1 | 9/2012 | Otis et al. | |
| 2012/0311072 A1 | 12/2012 | Huang et al. | |
| 2012/0313698 A1 | 12/2012 | Ochoa et al. | |
| 2013/0028305 A1 | 1/2013 | Gollakota et al. | |
| 2013/0028598 A1 | 1/2013 | Cavaliere et al. | |
| 2013/0069767 A1 | 3/2013 | Ovard et al. | |
| 2013/0176115 A1 | 7/2013 | Puleston et al. | |
| 2013/0215979 A1 | 8/2013 | Yakovlev et al. | |
| 2013/0223270 A1 | 8/2013 | Cheng | |
| 2013/0265140 A1 | 10/2013 | Gudan et al. | |
| 2013/0286959 A1 | 10/2013 | Lou et al. | |
| 2013/0299579 A1 | 11/2013 | Manku | |
| 2013/0322498 A1 | 12/2013 | Maquire | |
| 2014/0016719 A1 | 1/2014 | Manku | |
| 2014/0044233 A1 | 2/2014 | Morton | |
| 2014/0113561 A1 | 4/2014 | Maguire | |
| 2014/0313071 A1 | 10/2014 | Mccorkle | |
| 2014/0357202 A1 | 12/2014 | Malarky | |
| 2014/0364733 A1 | 12/2014 | Huang et al. | |
| 2015/0091706 A1 | 4/2015 | Chemishkian et al. | |
| 2015/0108210 A1 | 4/2015 | Zhou | |
| 2015/0168535 A1 | 6/2015 | Httner et al. | |
| 2015/0311944 A1 | 10/2015 | Gollakota et al. | |
| 2015/0381269 A1 | 12/2015 | Deyle | |
| 2016/0094933 A1 | 3/2016 | Deyle | |
| 2016/0266245 A1 | 9/2016 | Bharadia et al. | |
| 2016/0365890 A1 | 12/2016 | Reynolds et al. | |
| 2017/0180075 A1 | 6/2017 | Gollakota et al. | |
| 2017/0180178 A1 | 6/2017 | Gollakota et al. | |
| 2017/0180703 A1 | 6/2017 | Kovacovsky et al. | |
| 2017/0331509 A1 | 11/2017 | Gollakota et al. | |
| 2018/0024224 A1 * | 1/2018 | Seller | G01S 5/06 342/461 |
| 2018/0331865 A1 | 11/2018 | Ziv et al. | |
| 2018/0358996 A1 | 12/2018 | Gollakota et al. | |
| 2018/0375703 A1 | 12/2018 | Kellogg et al. | |

(56) References Cited

U.S. PATENT DOCUMENTS

| | | | |
|---|---|---|---|
| 2019/0116078 | A1 | 4/2019 | Gollakota et al. |
| 2019/0158341 | A1 | 5/2019 | Talla et al. |
| 2020/0125916 | A1 | 4/2020 | Karani et al. |

FOREIGN PATENT DOCUMENTS

| | | |
|---|---|---|
| EP | 2976734 | 1/2016 |
| WO | 2014153516 A1 | 9/2014 |
| WO | 2015123306 A1 | 8/2015 |
| WO | 2015123341 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |
| WO | 2018075653 A1 | 4/2018 |
| WO | 2018187737 A1 | 10/2018 |

OTHER PUBLICATIONS

US 10,187,241 B2, 01/2019, Gollakota et al. (withdrawn)
Cadence, "Cadence Spectre RF Option", http://www.cadence.com/products/rf/spectre_rf_simulation/pages/default.aspx. (Retrieved Jul. 19, 2018).
DigiPoints. DigiPoints Series vol. 1 Leader Guide Module 9—Network Architectures. Sep. 18, 2015, pp. 9.i-9.18.
IEEE, "IEEE Standard for Ethernet", http://standards.ieee.org/getieee802/download/802.11-2012.pdf., Dec. 28, 2012.
International Search Report and Written Opinion received for PCT Appl. No. PCT/US2017/057207, dated Jan. 8, 2018.
Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).
NASA, "A Wi-Fi Reflector Chip to Speed Up Wearables", http://www.jpl.nasa.gov/news/news.php?feature=4663. Jul. 22, 2015.
PCT Application No. PCT/US2018/026545 titled 'Image and/or Video Transmission Using Backscatter Devices' filed on Apr. 6, 2018.
QUALCOMM, "AR9462 Single-chip, 2.4/5GHz, 2-stream 802.11a/b/g/n and BT 4.0 + HS SoC Solution with SST Technology", http://www.qca.qualcomm.com/wp-content/uploads/2013/11/AR9462.pdf. (Retrieved Jul. 19, 2018).
QUALCOMM. "QCA4002/4004 Qualcomm low-power Wi-Fi", http://www.eeworld.com.cn/zt/wireless/downloads/QCA4002-4004FIN.pdf. (Retrieved Jul. 19, 2018).
Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).
U.S. Appl. No. 15/752,214 entitled 'Backscatter Devices and Network Systems Incorporating Backscatter Devices' filed on Feb. 12, 2018, pp. all.
U.S. Appl. No. 15/601,836, enitled "Ambient Backscatter Tranceivers, Apparatuses, Systems, and Methods for Communicating Using Backscatter of Ambient RF Signals", filed May 22, 2017.
U.S. Appl. No. 16/072,858, titled "Backscatter Devices Including Examples of Single Sideband Operations", filed on Jul. 25, 2018.
Unknown, "Altera de1 fpga development board", http://www.terasic.com.tw/cgi-bin/page/archive.pl?No=83.(Retrieved Jul. 19, 2018).
Unknown, "Analog Devices HMC190BMS8/190BMS8E", https://www.hittite.com/content/documents/data_sheet/hmc190bms8.pdf. (Retrieved Jul. 19, 2018).
Unknown, "Nest Cam Indoor", https://nest.com/camera/meet-nest-cam/?dropcam=true. 2018. (Retrieved Jul. 19, 2018).
U.S. Appl. No. 15/958,880 titled 'Apparatuses, Systems, and Methods for Communicating Using MIMO and Spread Spectrum Coding in Backscatter of Ambient Signals' filed on Apr. 20, 2018.
"Advanced Television Systems Committee (ATSC) (Sep. 1995) "ATSC Digital Television Standard," ATSC Doc. A/53, 74 pages", Sep. 1995.

"Analog Devices (retrieved Apr. 2016) "ADG919 RF Switch Datasheet," available online at: http://www.datasheet-pdf.com/PDF/ADG919-Datasheet-AnalogDevices-140819", Apr. 2016.
"Analog Devices, Inc. (retrieved Jan. 2016) "ADG902 RF switch datasheet," available online at: http://www.analog.com/static/imported-files/data_sheets/adg901_902.pdf", Jan. 2016.
"Axcera.com (retrieved Jan. 2016) "8VSB vs. COFDM," available online at: http://www.axcera.com/downloads/technotes-whitepapers/technote_4.pdf", Jan. 2016.
"DiBEG (May 2014; retrieved Jan. 2016) "The Launching Country," available online at: http://www.dibeg.org/world/world.html", May 2014.
"E. Inc. (retrieved Apr. 2016) "Universal software radio peripheral," available online at: http://ettus.com", Apr. 2016.
"Encounternet (retrieved Jan. 2016) "The Encounternet Project," available online at: http://encounternet.net/", Jan. 2016.
"Federal Communications Commission (retrieved Jan. 2016) "41 dBu service contours around ASRN 1226015, FCC TV query database," available online at: http://transition.fcc.gov/fcc-bin/tvq?list=0&facid=69571", Jan. 2016.
"STMicroelectronics (Jul. 2012) "TS 881 Datasheet," 1 page", Jul. 2012.
Anthony,, Sebastian , ""Free energy harvesting from TV signals, to power a ubiquitous internet of things"", ExtremeTech, google search, Jul. 8, 2013, 8 pages, Jul. 8, 2013.
Bharadia, et al., "Backfi: High Throughput WiFi Backscatter", In Proceedings of the 2015 ACM Conference on Special Interest Group on Data Communication, Aug. 2015.
Bharadia, et al., ""Full duplex backscatter"", Proceedings of the 12th ACM Workshop on Hot Topics in Networks, Article No. 4, pp. 1-7, Nov. 2013.
Bharadia, et al., ""Full duplex radios"", Proceedings of the ACM SIGCOMM 2013 (SIGCOMM '13), pp. 375-386, Aug. 2013.
Bohorquez, et al., ""A 350μW CMOS MSK transmitter and 400μW OOK super-regenerative receiver for medical implant communications"", IEEE Journal of Solid-State Circuits, 44(4):1248-1259, Apr. 2009.
Buettner, ""Backscatter Protocols and Energy-Efficient Computing for RF-Powered Devices"", PhD Thesis, University of Washington, Seattle, WA, 144 pages, Retrieved Jan. 2016., 2012.
Buettner, et al., ""Dewdrop: An energy-aware runtime for computational RFID"", Proceedings of the 8th USENIX Conference on Networked Systems Design and Implementation (NSDI'11), pp. 197-210, Mar. 2011.
Buettner, et al., ""RFID Sensor Networks with the Intel WISP"", Proceedings of the 6th ACM Conference on Embedded Network Sensor Systems (SenSys '08), pp. 393-394, Nov. 2008.
Chen, et al., Denis Guangyin Chen et al, "Pulse-Modulation Imaging—Review and Performance Analysis", IEEE Transactions on Biomedical Circuits and Systems, vol. 5, No. 1, Feb. 2011, at 64.
Chokshi, et al., "Yes! Wi-Fi and Bluetooth Can Coexist in Handheld Devices", Emerging Chokshi, Emerging and Embedded Business Unit, Marvell Semiconductor, Inc., Mar. 2010.
Dayhoff , , ""New Policies for Part 15 Devices"", Federal Communications Commission (FCC) Telecommunications Certification Body Council (TCBC) Workshop 2005, 13 pages, May 2005.
Dementyev, et al., ""Wirelessly Powered Bistable Display Tags"", ACM International Joint Conference on Pervasive and Ubiquitous Computing (UbiComp '13), pp. 383-386, Sep. 2013.
Dementyev, A. et al., ""A Wearable UHF RFID-Based EEG System"", 2013 IEEE International Conference on RFID (RFID), pp. 1-7, Apr.-May 2013.
Duarte, et al., ""Full-duplex wireless communications using off-the-shelf radios: Feasibility and first results"", 2010 Conference Record of the 44th Asilomar Conference on Signals, Systems and Computers (ASILOMAR), pp. 1558-1562, Nov. 2010.
Duarte, , ""Full-duplex Wireless: Design, Implementation and Characterization"", Ph.D. thesis, Rice University, 70 pages, Apr. 2012.
Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, Retrieved Jan. 2016, 2006 copyright.

(56) References Cited

OTHER PUBLICATIONS

Elliott, , ""Average U.S. Home Now Receives a Record 118.6 TV Channels, According to Nielsen"", available online at: http://www.nielsen.com/us/en/insights/pressroom/2008/average_u_s_home.html, Jun. 2008.

Ensworth, et al., "Every smart phone is a backscatter reader: Modulated backscatter compatibility with bluetooth 4.0 low energy (ble) devices". 2015 IEEE International Conference on RFID. (Retrieved Jul. 19, 2018).

Gorlatova, et al., ""Energy harvesting active networked tags (EnHANTs) for ubiquitous object networking"", IEEE Wireless Communications, 17(6):18-25, Dec. 2010.

Greene, et al., "Intel's Tiny Wi-Fi Chip Could Have a Big Impact". MIT Technology review, Sep. 21, 2012.

Guo, et al., ""Virtual full-duplex wireless communication via rapid on-off-division duplex"", 48th Annual Allerton Conference on Communication, Control, and Computing (Allerton), pp. 412-419, Sep.-Oct. 2010.

Jain, et al., ""Practical, real-time, full duplex wireless"", Proceedings of the 17th Annual International Conference on Mobile Computing and Networking (MobiCom'11), pp. 301-312, Sep. 2011.

Javed, et al., Sajid Javed et al, Background Subtraction via Superpixel-Based Online Matrix Decomposition With Structured Foreground Constraints, ICCVW '15 Proceedings of the 2015 IEEE International Conference on Computer Vision Workshop, Dec. 2015.

Johnston, Scott , "Software Defined Radio Hardware Survey", Oct. 2011, 31 pgs.

Kellogg, et al., ""Bringing gesture recognition to all devices"", Proceedings of the 11th USENIX Conference on Network Systems Design and Implementation (NSDI'14), pp. 303-316, Apr. 2014.

Kellogg, et al., "Wi-Fi Backscatter: Internet Connectivity for RF-Powered Devices", University of Washington, SIGCOMM'14, Aug. 17-22, 2014.

Khannur, et al., "A Universal UHF RFID reader IC in 0.18-µm CMOS Technology". Solid-State Circuits, IEEE Journal of, 43(5):1146-1155, May 2008.

Kim, et al., ""Flush: a reliable bulk transport protocol for multihop wireless networks"", Proceedings of the 5th International Conference on Embedded Networked Sensor Systems (SenSys '07), pp. 351-365, Nov. 2007.

Kleinrock, et al., ""Packet Switching in Radio Channels: Part I—Carrier Sense Multiple-Access Modes and Their Throughput-Delay Characteristics"", IEEE Transactions on Communications, 23(12):1400-1416, Dec. 1975.

Kodialam, et al., ""Fast and reliable estimation schemes in RFID systems"", Proceedings of the 12th Annual International Conference on Mobile Computing and Networking (MobiCom '06), pp. 322-333, Sep. 2006.

Koomey, JG et al., ""Implications of Historical Trends in the Electrical Efficiency of Computing"", IEEE Annals of the History of Computing, 33(3):46-54, Aug. 2011.

Kuester, et al., ""Baseband Signals and Power in Load-Modulated Digital Backscatter," IEEE Antenna and Wireless Propagation Letter, vol. II, 2012, pp. 1374-1377, Nov. 2012."

Lazarus, , ""Remote, wireless, ambulatory monitoring of implantable pacemakers, cardioverter defibrillators, and cardiac resynchronization therapy systems: analysis of a worldwide database"", Pacing and Clinical Electrophysiology, 30(Suppl 1):S2-S12, Jan. 2007.

Liang, et al., ""Surviving wi-fi interference in low power zigbee networks"", Proceedings of the 8th ACM Conference on Embedded Networked Sensor Systems (SenSys '10), pp. 309-322, Nov. 2010.

Liu, et al., ""Ambient Backscatter: Wireless Communication out of Thin Air"", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.

Liu, et al., ""Digital Correlation Demodulator Design for RFID Reader Receiver"", IEEE Wireless Communications and Networking Conference (WCNC 2007), pp. 1666-1670, Mar. 2007.

Liu, et al., ""Enabling Instantaneous Feedback with Full-duplex Backscatter"", Proceedings of the 20th Annual International Conference on Mobile Computing and Networking (MobiCom'14), pp. 67-78, Sep. 2014.

Lu, et al., "Enfold: Downclocking OFDM in WiFi". In Proceedings of the 20th annual international conference on Mobile computing and networking, pp. 129-140. ACM, Sep. 2014.

Lu, et al., "Slomo: Downclocking WiFi Communication". In NSDI, pp. 255-258, Apr. 2013.

Mace, , ""Wave reflection and transmission in beams"", Journal of Sound and Vibration, 97(2):237-246, Nov. 1984.

Manweiler, et al., "Avoiding the Rush Hours: Wifi Energy Management via Traffic Isolation". In MobiSys, Jul. 2011.

Mastrototaro, , ""The MiniMed Continuous Glucose Monitoring System"", Diabetes Technology & Therapeutics, 2(Suppl 1):13-18, Dec. 2000.

Merrit, , "Atheros targets cellphone with Wi-Fi chip", EE Times (Nov. 2, 2009), http://www.eetimes.com/document.asp?doc_id=1172134.

Metcalfe, et al., ""Ethernet: Distributed packet switching for local computer networks"", Communications of the ACM, 19(7):395-404, Jul. 1976.

Mishra, et al., ""Supporting continuous mobility through multi-rate wireless packetization"", Proceedings of the 9th Workshop on Mobile Computing Systems and Applications (HotMobile '08), pp. 33-37, Feb. 2008.

Mittal, et al., "Empowering developers to estimate app energy consumption". In MobiCom, Aug. 2012.

Murray Associates, "The Great Seal Bug Part 1", Murray Associates, Mar. 2017.

Mutti, et al., ""CDMA-based RFID Systems in Dense Scenarios: Concepts and Challenges"", 2008 IEEE International Conference on RFID, pp. 215-222, Apr. 2008.

Naderiparizi, et al., Saman Naderiparizi etal, "Ultra-Low-Power Wireless Streaming Cameras", arXiv:1707.08718v1, Jul. 27, 2017, Cornell University Library.

Navaneethan, et al., Navaneethan, VM. Security Enhancement of Frequency Hopping Spread Spectrum Based on Oqpsk Technique. IOSR Journal of Electronics and Communication Engineering. May 2016. 62.

Nikitin, et al., ""Passive tag-to-tag communication"", 2012 IEEE International Conference on RFID (RFID), pp. 177-184, Apr. 2012.

Nikitin, et al., ""Theory and measurement of backscattering from RFID tags"", IEEE Antennas and Propagation Magazine, 48(6):212-218, Dec. 2006.

Obeid, et al., ""Evaluation of spike-detection algorithms for a brain-machine interface application"", IEEE Transactions on Biomedical Engineering, 51(6):905-911, Jun. 2004.

Occhiuzzi, et al., ""Modeling, Design and Experimentation of Wearable RFID Sensor Tag"", IEEE Transactions on Antennas and Propagation, 58(8):2490-2498, Aug. 2010.

Pandey, et al., ""A Sub-100 µ W MICS/ISM Band Transmitter Based on Injection-Locking and Frequency Multiplication"", IEEE Journal of Solid-State Circuits, 46(5):1049-1058, May 2011.

Parks, et al., ""A wireless sensing platform utilizing ambient RF energy"", 2013 IEEE Topical Conference on Biomedical Wireless Technologies, Networks, and Sensing Systems (BioWireleSS), pp. 154-156, Jan. 2013.

Parks, Aaron N. et al., "Turbocharging Ambient Backscatter Communication", SIGCOMM, Aug. 2014, 1-12.

Pillai, et al., ""An Ultra-Low-Power Long Range Battery/Passive RFID Tag for UHF and Microwave Bands With a Current Consumption of 700 nA at 1.5 V"", IEEE Transactions on Circuits and Systems I: Regular Papers, 54(7):1500-1512, Jul. 2007.

Proakis, et al., "Digital communications". 2005. McGraw-Hill, New York. (Retrieved Jul. 19, 2018).

Qing, et al., ""A folded dipole antenna for RFID"", IEEE Antennas and Propagation Society International Symposium, 1:97-100, Jun. 2004.

Rabaey, et al., ""PicoRadios for wireless sensor networks: the next challenge in ultra-low power design"", 2002 IEEE International Solid-State Circuits Conference, Digest of Technical Papers (ISSCC), 1:200-201, Feb. 2002.

(56) References Cited

OTHER PUBLICATIONS

Ransford, et al., "Mementos: system support for long-running computation on RFID-scale devices", ACM SIGPLAN Notices—Proceedings of the 16th International Conference on Architecturla Support for Programming Languages and Operating Systems (ASPLOS '11), 46(3):159-170, Mar. 2011.
Rao, KVS et al., ""Antenna design for UHF RFID tags: a review and a practical application"", IEEE Transactions on Antennas and Propagation, 53(12):3870-3876, Dec. 2005.
Rattner, et al., "Connecting the Future: It's a Wireless World", Sep. 2013.
Roy, et al., ""RFID: From Supply Chains to Sensor Nets"", Proceedings of the IEEE, 98(9):1583-1592, Jul. 2010.
Sample, et al., ""Design of an RFID-Based Battery-Free Programmable Sensing Platform"", IEEE Transactions on Instrumentation and Measurement, 57(11):2608-2615, Nov. 2008.
Sample, et al., ""Experimental results with two wireless power transfer systems"", IEEE Radio and Wireless Symposium (RAWCON), pp. 16-18, Jan. 2009.
Seigneuret, et al., ""Auto-tuning in passive UHF RFID tags"", 2010 8th IEEE International NEWCAS Conference (NEWCAS), pp. 181-184, Jun. 2010.
Sen, et al., ""CSMA/CN: Carrier sense multiple access with collision notification"", Proceedings of the 16th Annual International Conference on Mobile Computing and Networking (MobiCom'10), pp. 25-36, Sep. 2010.
Smith, JR et al., ""A wirelessly-powered platform for sensing and computation"", ACM International Joint Conference on Pervasive and Ubiquitous Computing (UbiComp 2006), 4206:495-506, Sep. 2006.
So, et al., ""Multi-channel mac for ad hoc networks; handling multi-channel hidden terminals using a single transceiver"", Proceedings of the 5th ACM International Symposium on Mobile Ad Hoc Networking and Computing, pp. 222-233, May 2004.
Srinivasan, et al., ""An empirical study of low-power wireless"", ACM Transactions on Sensor Networks (TOSN), vol. 6, Issue 2, Article No. 16, Feb. 2010.
Thomas, et al., ""A 96 Mbit/sec, 15.5 pJ/bit 16-QAM modulator for UHF backscatter communication"", 2012 IEEE International Conference on RFID (RFID), IEEE RFID Virtual Journal, pp. 185-190, Apr. 2012.
Tubaishat, et al., ""Sensor networks: an overview"", IEEE Potentials, 22(2):20-23, Apr.-May 2003.
Walden, , ""Analog-to-digital converter survey and analysis"", IEEE Journal on Selected Areas in Communications, 17(4):539-550, Apr. 1999.
Welbourne, et al., ""Building the Internet of Things Using RFID: The RFID Ecosystem Experience"", IEEE Internet Computing, 13(3):48-55, May-Jun. 2009.
Wuu, et al., ""Zero-Collision RFID Tags Identification Based on CDMA"", 5th International Conference on Information Assurance and Security (IAS'09), pp. 513-516, Aug. 2009.
Yi, et al., ""Analysis and Design Strategy of UHF Micro-Power CMOS Rectifiers for Micro-Sensor and RFID Applications"", IEEE Transactions on Circuits and Systems I: Regular Papers, 54(1):153-166, Jan. 2007.
Ying, et al., "A System Design for UHF RFID Reader". In Communication Technology, 2008. ICCT 2008. 11th IEEE International Conference on, pp. 301-304. IEEE, Nov. 2008.
Zalesky, et al., ""Integrating segmented electronic paper displays into consumer electronic devices"", 2011 IEEE International Conference on Consumer Electronics (ICCE), pp. 531-532, Jan. 2011.
Zhang, et al., ""Frame retransmissions considered harmful: improving spectrum efficiency using micro-ACKs"", Proceedings of the 18th Annual International Conference on Mobile Computing and Networking (MobiCom '12), pp. 89-100, Aug. 2012.
Zhang, et al., "EkhoNet: High Speed Ultra Low-power Backscatter for Next Generation Sensors", School of Computer Science, University of Massachusetts, Amherst, MA 01003, Sep. 2014.
Analog devices—rf/if circuits, http://www.analog.com/library/analogDialogue/archives/43-09/EDCh%204%20rf%20if.pdf, Jan. 2007, 74 pages.
U.S. Appl. No. 15/923,238 titled "Radio Frequency Communication Devices Having Backscatter and Non-Backscatter Communication Modes and Hardware Re-Use" filed Mar. 16, 2018.
U.S. Appl. No. 16/119,055 titled "Devices and Methods for Backscatter Communication Using One or More Wireless Communication Protocols Including Bluetooth Low Energy Examples" filed Aug. 31, 2018.
Andrews, et al., A Passive Mixer-First Receiver With Digitally Controlled and Widely Tunable RF Interface, IEEE Journal of Solid-State Circuits, vol. 45, No. 12, Dec. 2010, p. 2696-2708.
Kellogg, et al., Passive Wi-Fi: Bringing Low Power to Wi-Fi Transmissions, Proceedings of the 13th USENIX Symposium on Networked Systems Design and Implementation, Mar. 2016, 15 pages.
Marki, et al., Mixer Basics Primer: A Tutorial for RF & Microwave Mixers, Marki Microwave, Inc., 2010, 12 pages.
Talla, et al., Hybrid Analog-Digital Backscatter: A New Approach for Battery-Free Sensing, IEEE International Conference on RFID, May 2013, 8 pages.
"6-dBi Gain Patch Antenna", https://www.arcantenna.com/index.php/product_documents/get/document/id/492/, Accessed: Mar. 2017.
"A9 4K Ultra HD Camera Soc", http://www.ambarella.com/uploads/docs /A9-product-brief.pdf, Apr. 2020.
"ADG919 RF Switch", Analog Devices, http://www.analog.com/media/en/ technical-documentation/data-sheets/ADG918_919.pdf, Accessed Mar. 2017.
"Alexa—Top Sites in the United States", http://www.alexa.com/topsites/countries/US. Loaded Jan. 13, 2015.
"Barker Code", http://mathworld.wolfram.com/BarkerCode.html, Accessed Sep. 2017.
"BQ25570 Nano Power Boost Charger and Buck Converter for Energy Harvester Powered Applications", Texas Instruments, http://www.ti.com/lit/ds/symlink/bo25570.pdf, revised Mar. 2019, 1-45.
"Centeye Stonyman Image Sensor Datasheet", http://www.centeye.com/products/ current-centeye-vision-chips/, Accessed Mar. 2017.
"Chip Inductors—0402 HP Series (1005)", Coilcraft, http://www.coilcraft.com/pdfs/0402hp.pdf, revised Oct. 3, 2018.
"Cota: Real Wireless Power", Cota by Ossia, http://www.ossiainc.com/, Apr. 2020.
"Digipoints Series vol. 1 Leader Guide Module 9—Network Architectures", http://www.scte.org/SCTE/Resources/DigiPoints_Volume_1.aspx, Accessed Jun. 17, 2018, 8.12, 8.15, last bullet point.
"Elisa-3 Robot", http://www.gctronic.com/ doc/index.php/Elisa-3, Accessed Mar. 2017.
"Grey Scale Ramp", https://jackelworthyproject.files.wordpress.com/2015/01/greyscaleramp.png, Dec. 11, 2019.
"Head Jack Pluggable RFID Reader for Smartphones", http://www.rfidtagworld.com/product s/Ear-Jack-reader-UHF_1056.html, Apr. 2020.
"Igloo Nano Low Power Flash FPGAS With Flash Freeze Technology", https://www.microsemi.com/documentportal/doc_view/130695-ds0110-igloonano-low-power-flash-fpgasdatasheet, accessed Mar. 2017.
"LMV7219 Comparator", http://www.ti.com/lit/ds/symlink/lmv7219.pdfl, accessed Sep. 2017.
"NCX2200I Low Power Comparator Datasheet", http://www.nxp.com/documents/data_ sheet/NCX2200.pdf, Accessed Mar. 2017.
"Phantomjs—Scriptable Headless Browser", http://phantomjs.org/, loaded Jan. 14, 2015.
"RF5110 Amplifier", http://www.rfmd.com/store/downloads/dl/file/id/30508/ 5110g_product_data_sheet.pdf, Accessed Mar. 2017.
"Ring Video Doorbell", https://ring.com/, Accessed Mar. 2017.
"S-882Z Series: Ultra-Low Volatage Operation Charge Pump IC for Step-Up DC-DC Converter Startup", Seiko Instruments Inc, http://www.eetchina.com/ARTICLES/2006MAY/PDF/S882Z_E.pdf, Apr. 2020.
"SIT8021AI Oscillator Datasheet", https://www.sitime.com/products/ datasheets/sit8021/SiT8021-datasheet.pdf, Accessed Mar. 2017.

(56) References Cited

OTHER PUBLICATIONS

"SMS7630-061: Surface-Mount, 0201 Zero Bias Silicon Schottky Detector Diode", Skyworks, http://www.skyworksinc.com/uploads/documents/SMS7630_061_201295G.pdf, Jul. 26, 2019.

"Synopsys Design Complier", http://www.synopsys.com/Tools/Implementation/RTLSynthesis/ DesignCompiler/Pages/default.aspx, Jan. 13, 2018.

"USRP X-300", https://www.ettus.com/ product/details/X300-KIT, Accessed Mar. 2017.

"Wattup—Wireless Charging 2.0", Energous Overview, http://www.energous.com/overview/, Apr. 2020.

"Wisp 5 Platform", http: //wisp5.wikispaces.com/WISP+Home, Accessed Mar. 2017.

Bary, Emily , "Snapchat Spectacles Review: The Good, The Bad, The Revolutionary", http://www.barrons.com/articles/snapchat-spectacles-review-the-good-the-bad-the-revolutionary-1487846715, dated Dec. 12, 2019.

Beard, Randall H. et al., "Using Wearable Video Technology to Build a Point-of-View Surgical Education Library", JAMA Surgery, vol. 151, No. 8, Aug. 2016, 771-772.

Best, S.R. et al., "A Tutorial on the Receiving and Scattering Properties of Antennas", IEEE Antennas and Propagation Magazine, vol. 51, Issue 5, Oct. 2009, 26-37.

Chen, Guangyin D. et al., "Pulse-Modulation Imaging—Review and Performance Analysis", IEEE Transactions on Biomedical Circuits and Systems, vol. 5, No. 1, Feb. 2011, 64-82.

Chen, Long et al., "A 0.7-V 0.6-µW 100-kS/s Low-Power SAR ADC With Statistical Estimation-Based Noise Reduction", IEEE Journal of Solid-State Circuits, vol. 52, Issue 5, May 2017, 1388-1398.

Consortium, W.P. , "Qi Wireless Power Specification", Introduction to the Power Class 0 Specification, Version 1.2.3, Feb. 2017.

Covic, Grant A. et al., "Inductive Power Transfer", Proceedings of the IEEE, vol. 101, No. 6, Jun. 2013, 1276-1289.

Curty, J.-P. et al., "Remotely Powered Addressable UHF RFID Integrated System", IEEE Journal of Solid-State Circuits, vol. 40, No. 11, Nov. 2005.

Ensworth, Joshua F. et al., "Waveform-Aware Ambient RF Energy Harvesting", IEEE International Conference on RFID, Apr. 8-10, 2014, 67-73.

Fuller, S.B. et al., "Controlling Free Flight of a Robotic Fly Using an Onboard Vision Sensor Inspired by Insect Ocelli", Journal of the Royal Society Interface, 11(97):20140281.

Gollakota, Shyamnath et al., "Secure In-Band Wireless Pairing", Proceedings of the 20th USENIX Conference on Security, Aug. 2011; 16 pages.

Gudan, Kenneth et al., "Ultra-Low Power 2.4GHz RF Energy Harvesting and Storage System With -25dBm Sensitivity", IEEE International Conference on RFID, Apr. 15-17, 2015.

Hagerty, Joseph A. et al., "Recycling Ambient Microwave Energy With Broad-Band Rectenna Arrays", IEEE Transactions on Microwave Theory and Techniques, vol. 52, No. 3, Mar. 2004.

Hanson, S. et al., "A 0.5 V Sub-Microwatt CMOS Image Sensor With Pulse-Width Modulation Read-Out", IEEE Journal of Solid-State Circuits, vol. 45, Issue 4, Mar. 2010, 759-767.

Hawkes, Allen M. et al., "A Microwave Metamaterial With Integrated Power Harvesting Functionality", Applied Physics Letters 103, 163901, Oct. 2013.

Jadidian, Jouya et al., "Magnetic MIMO: How to Charge Your Phone in Your Pocket", MobiCom, The 20th Annual International conference on Mobile Computing and Networking, Sep. 7-11, 2014.

Javed, Sajid et al., "Background Subtraction via Superpixel-Based Online Matrix Decomposition With Structured Foreground Constraints", ICCVW '15 Proceedings of the 2015 IEEE International Conference on Computer Vision Workshop (ICCVW), Dec. 2015, DOI: 10.1109/ICCVW.2015.123, p. 1, Second col., Third Paragraph.

Kapucu, Kerem et al., "A Passive UHF RFID System With a Low-Power Capacitive Sensor Interface", 2014 IEEE RFID Technology and Applications Conference (RFID-TA), Sep. 8-9, 2014, 301-305.

Kawahara, Yoshihiro et al., "Power Harvesting From Microwave Oven Electromagnetic Leakage", UbiComp '13, Session: Hardware, Sep. 8-12, 2013, Zurich, Switzerland, 373-381.

Kawahara, Yoshihiro et al., "Sensprout: Inkjet-Printed Soil Moisture and Leaf Wetness Sensor", UbiComp '12, Sep. 5-8, 2012, Pittsburgh, USA, 545.

Kellogg, Bryce et al., "Bringing Gesture Recognition to All Devices", Proceedings of the 11th USENIX Symposium on Networked Systems Design and Implementation (NSDIm'14), Apr. 2-4, 2014, Seattle,WA, USA, 303-316.

Kellogg, Bryce et al., "Wi-Fi Backscatter: Internet Connectivity for RF-Powered Devices", SIGCOMM '14, Aug. 17-22, 2014, Chicago, IL., USA.

Kester, Walt , "Understand SINAD, ENOB, SNR, THD, THD + N, and SFDR so you Don't get Lost in the Noise Floor", MT-003 Tutorial, https://www.analog.com/media/en/training-seminars/tutorials/MT-003.pdf, Jan. 2009.

Kurs, André et al., "Wireless Power Transfer via Strongly Coupled Magnetic Resonances", Science Magazine, vol. 317, Jul. 6, 2007, 83-86.

Leñero-Bardallo, Juan A. et al., "A 3.6 µs Latency Asynchronous Frame-Free Event-Driven Dynamic-Vision-Sensor", IEEE Journal of Solid-State Circuits, vol. 46, No. 6, Jun. 2011, 1443-1455.

Likamwa, Robert et al., "Energy Characterization and Optimization of Image Sensing Toward Continuous Mobile Vision", Proceedings from the 11th Annual International Conference on Mobile Systems, Applications, and Services, Jun. 2013, 69-82.

Liu, Vincent et al., "Ambient Backscatter: Wireless Communication Out of Thin Air", SIGCOMM '13, Aug. 12-16, 2013, Hong Kong, China, 39-50.

Low, Zhen N. et al., "Design and Test of a High-Power High-Efficiency Loosely Coupled Planar Wireless Power Transfer System", IEEE Transactions on Industrial Electronics, vol. 56, No. 5, May 2009, 1801-1812.

Magno, Michele et al., "Adaptive Power Control for Solar Harvesting Multimodal Wireless Smart Camera", 2009 Third ACM/IEEE International Conference on Distributed Smart Cameras (ICDSC), Aug. 30-Sep. 2, 2009.

Mallik, Udayan et al., "Temporal Change Threshold Detection Imager", 2005 IEEE International Solid-State Circuits Conference (ISSCC 2005), Feb. 8, 2005, 362-363, 603.

Michel, Fridolin et al., "A 250mV 7.5µW 61dB SNDR CMOS SC ΔΣ Modulator Using a Near-Threshold-Voltage-Biased CMOS Inverter Technique", 2011 IEEE International Solid-State Circuits Conference, Session 27, Feb. 20-24, 2011, 476-478.

Moore, Stephen , "Moving Camera on a Motorcycle Video Clip", YouTube, https://www.youtube.com/watch?v=sHj3xSG-R_E&t=376s, Uploaded Apr. 22, 2015.

Murmann, B. , "ADC Performance Survey 1997-2019", http://web.stanford.edu/~murmann/adcsu rvey.html, dated Dec. 12, 2019.

Naderiparizi, S. et al., "Glimpse: A Programmable Early-Discard Camera Architecture for Continuous Mobile Vision", Proceedings from the 15th Annual International Conference on Mobile Systems, Applications, and Services, Jun. 19-23, 2017, 292-305.

Naderiparizi, S. et al., "Self-Localizing Battery-Free Cameras", Proceedings from 2015 ACM International Joint Conference on Pervasive and Ubiquitous Computing, Sep. 2015, 445-449.

Naderiparizi, S. et al., "WISPCam: A Battery-Free RFID Camera", 2015 IEEE International Conference on RFID (RFID), Apr. 15-17, 2015.

Naderiparizi, S. et al., "WISPCam: An RF-Powered Smart Camera for Machine Vision Applications", Proceedings from the 4th International Workshop on Energy Harvesting and Energy-Neutral Sensing Systems, Nov. 2016, 19-22.

Naderiparizi, Saman et al., "Battery-Free Connected Machine Vision With WISPCam", GetMobile, vol. 20, Issue 1, Jan. 2016, 10-13.

Naderiparizi, Saman et al., "Ultra-Low-Power Wireless Streaming Cameras", arXiv:1707.08718 [cs.ET] Jul. 27, 2017, Cornell University Library, Accessed Jun. 14, 2018.

(56) References Cited

OTHER PUBLICATIONS

Navaneethan, V.M. , "Security Enhancement of Frequency Hopping Spread Spectrum Based on OQPSK Technique", IOSR Journal of Electronics and Communication Engineering, ICEICT 2016, e-ISSN: 2278-2834, p-ISSN: 2278-8735, abstract; p. 62, fourth and fifth paragraphs, p. 63, sixth paragraph; p. 67, second paragraph, 62-70.
Nayar, S.K. et al., "Towards Self-Powered Cameras", 2015 IEEE International Conference on Computational Photography (ICCP), Apr. 24-26, 2015, 1-10.
Nelson, G.M. et al., "Design and Simulation of a Cockroach-Like Hexapod Robot", Proceedings from the 1997 IEEE International Conference on Robotics and Automation, vol. 2, Apr. 25, 1997, 1106-1111.
Nikitin, P.V. et al., "Differential RCS of RFID Tag", Electronics Letters, vol. 43, Issue 8, Apr. 12, 2007.
Nikitin, P.V. et al., "Theory and Measurement of Backscattering From RFID Tags", IEEE Antennas and Propagation Magazine, vol. 48, Issue 6, Dec. 2006, 212-218.
Olgun, U. et al., "Design of an Efficient Ambient WiFi Energy Harvesting System", IET Microwaves, Antennas & Propagation, vol. 6, Iss. 11, Mar. 2012, 1200-1206.
Olgun, Ugur et al., "Efficient Ambient WiFi Energy Harvesting Technology and Its Applications", 2012 IEEE Antennas and Propagation Society International Symposium, Jul. 8-14, 2012.
Olgun, Ugur et al., "Wireless Power Harvesting With Planar Rectennas for 2.45 GHz RFIDs", 2010 URSI International Symposium on Electromagnetic Theory, Aug. 16-19, 2010, 3229-331.
Parks, Aaron N. , "A Wireless Sensing Platform Utilizing Ambient RF Energy", 2013 IEEE Topical Conference on Biomedical Wireless Technologies, Networks, and Sensing Systems, Jan. 20-23, 2013.
Rubenstein, M. et al., "Programmable Self-Assembly in a Thousand-Robot Swarm", Science, vol. 345, Issue 6198, Aug. 2014, 795-799.
Sample, Alanson et al., "Experimental Results With Two Wireless Power Transfer Systems", Proceedings of the 4th international conference on Radio and Wireless Symposium, Jan. 2009.
Sample, Alanson P. et al., "Design of an RFID-Based Battery-Free Programmable Sensing Platform", IEEE Transactions on Instrumentation and Measurement, vol. 57, No. 11, Nov. 2008.
Sarpeshkar, Rahul "Analog Versus Digital: Extrapolating From Electronics to Neurobiology", Neural Computation, vol. 10, Issue 7, Mar. 1998, 1601-1638.
Scott, Michael D. et al., "An Ultra-Low Power ADC for Distributed Sensor Networks", Proceedings of the 28th European Solid-State Circuits Conference, Oct. 2002, 255-258.
Shafik, R.A. et al., "On the Error Vector Magnitude as a Performance Metric and Comparative Analysis", 2006 International Conference on Emerging Technologies, Nov. 13-14, 2006, 27-31.
Souppouris, Aaron , "This Router Can Power Your Devices Wirelessly From 15 Feet Away", Energous Wattup Demo, Engadget, http://www.engadget.com/2015/01/05/ energous-wattup-wireless-charging-demo/, Jan. 5, 2015.
Swider, Matt , "Snapchat Spectacles (2016) Review", http://www.techradar.com/ reviews/snap-spectacles, Dec. 12, 2019.
Talla, Vamsi et al., "Battery-Free Cellphone", PACM Interact. Mob. Wearable Ubiquitous Technol. 1, 2, Article 25, Jun. 2017.
Talla, Vamsi et al., "Lora Backscatter: Enabling the Vision of Ubiquitous Connectivity", Proceedings of the ACM on Interactive, Mobile, Wearable and Ubiquitous Technologies, vol. 1, No. 3, Article 105, Sep. 2017, 105:1-105:24.
Talla, Vamsi et al., "Wi-Fi Energy Harvesting for Battery-Free Wearable Radio Platforms", IEEE International Conference on RFID, Apr. 15-17, 2015, 47-54.
Tang, Fang et al., "An 84 pW/Frame Per Pixel Current-Mode CMOS Image Sensor With Energy Harvesting Capability", IEEE Sensors Journal, vol. 12, No. 4, Apr. 2012, 720-726.
Trotter, Matthew S. et al., "Power-Optimized Waveforms for Improving the Range and Reliability of RFID Systems", 2009 IEEE International Conference on RFID, Apr. 27-28, 2009.
Trotter, Matthew S. , "Survey of Range Improvement of Commercial RFID Tags With Power Optimized Waveforms", IEEE RFID, Apr. 12-14, 2010, 195-202.
Valenta, Christopher R. et al., "Harvesting Wireless Power: Survey of Energy-Harvester Conversion Efficiency in Far-Field, Wireless Power Transfer Systems", IEEE Microwave Magazine, vol. 15, Issue 4, Jun. 2014, 108-120.
Vera, Gianfranco A. et al., "Design of a 2.45 GHz Rectenna for Electromagnetic (EM) Energy Scavenging", 2010 IEEE Radio and Wireless Symposium (RWS), Jan. 10-14, 2010, 61-64.
Visser, Hubregt J. et al., "Ambient RF Energy Scavenging: GSM and WLAN Power Density Measurements", Proceedings of the 38th European Microwave Conference, Oct. 27-31, 2008.
Wang, Anran et al,, "FM Backscatter: Enabling Connected Cities and Smart Fabrics", NSDI'17, Proceedings of the 14th USENIX Conference on Networked Systems Design and Implementation, Mar. 2017, 243-258.
Waters, Benjamin H. et al., "Powering a Ventricular Assist Device (VAD) With the Free-Range Resonant Electrical Energy Delivery (Free-D) System", Proceedings of the IEEE, vol. 100, No. 1, Jan. 2012, 138-149.
Yehl, Kevin et al., "High-Speed DNA-Based Rolling Motors Powered by RNase H", Nature Nanotechnology 11(2), Feb. 2016, 184-190.
65 nm Technology by TSMC, 2016, http://www.tsmc.com/english/dedicatedFoundry/technology/65nm.htm.
A 5.1-$\mu$W UHF RFID Tag Chip Integrated With Sensors for Wireless Environmental Monitoring, Proceedings of ESSCIRC, Sep. 2005, p. 279-282.
ADG904 by Analog Devices, Feb. 2016. https://www.analog.com/media/en/technical-documentation/data-sheets/ADG904.pdf.
Altera's Cyclone V FPGAS, https://www.altera.com/products/fpga/cycloneseries/cyclone-v/overview.html, Feb. 11, 2020.
AN1200.22 LoRa Modualtion Basics, www.semtech.com, May 2015.
Atmel 9399 ATA8520D Sensitivity Measurment, Oct. 2015, http://www.atmel.com/Images/Atmel-9399-ATA8520-Sensitivity-Measurement_Application-Note.pdf.
Cadence Spectre RF, http://www.cadence.com/products/rf/spectre_rf_simulation/pages/default.aspx, retrieved on Feb. 20, 2020.
CC2630 Simplelink 6LoWPAN, Zigbee Wireless MCU, Texas Instruments, http://www.ti.com/lit/ds/symlink/cc2630.pdf, Jul. 2016.
CC2640 Simplelink Bluetooth Wireless MCU, Texas Instruments, http://www.ti.com/lit/ds/symlink/cc2640.pdf, Jul. 2016.
CC3200 Simplelink WiFi and Internet-of-Things Solution, A Single-Chip Wireless MCU, http://www.ti.com/product/CC3200/samplebuy, Feb. 2017.
CC3200 Simplelink WiFi and Internet-of-Things Solution, A Single-Chip Wireless MCU, Texas Instruments, http://www.ti.com/lit/ds/symlink/cc3200.pdf, Feb. 2015.
DC Ultra: Concurrent Timing, Area, Power, and Test Optimization, http://www.synopsys.com/Tools/Implementation/RTLSynthesis/DesignCompiler/Pages/default.aspx, Synopsys, 2019, 2 pages.
DE0-CV Development Kit, terasIC, http://www.terasic.com/tw/cgi-bin/page/archive.pl?Language=English&CategoryNo=163&No=921&PartNo=2, Feb. 2020.
Deep Space Network, NASA Jet Propulsion Laboratory, California Institute of Technology, http://deepspace.jpl.nasa.gov, Feb. 2020.
EFL 700A39 STMicroelectronics, Battery Products, Digikey, https://www.digikey.com/product-detail/en/stmicroelectronics/EFL700A39/497-15109-ND/5052990, retrieved Feb. 11, 2020.
Flexible, Printed and Thin Film Batteries 2019-2029: IDTECHEX, www.idtechex.com/en/research-report/flexible-printed-and-thin-film-batteries-2019-2029/634, Feb. 11, 2020.
Bourzac, Katherine, Graphene Temporary Tattoo Tracks Vital Signs, https://spectrum.ieee.org/nanoclast/semiconductors/nanotechnology/graphene-temporary-tattoo, IEEE Spectrum's Nanotechnology Blog, Jan. 11, 2017, 2 pages.
High Ionic Conductivity, https://www.brightvolt.com/our-technology/, Feb. 11, 2020.
Intel Cyclone V FPGAS, https://www.intel.com/content/www/us/en/products/programmable/fpga/cyclone-v.html, Feb. 11, 2020.
Lora Alliance, https://www.lora-alliance.org/, Feb. 2016.

(56) References Cited

OTHER PUBLICATIONS

National Instruments: What is Labview?, https://www.ni.com/en-us/shop/labview.html, Feb. 2020.
Nearson Inc. S463AH-915, https://www.digikey.com/product-detail/en/nearson-inc/S463AH-915/730-1052-ND/4571854, Feb. 2020.
How Much Does an RFID Tag Cost Today?, RFID Journal, https://www.rfidjournal.com/faq/show?85, Feb. 2016.
Semtech SX1276 Transceiver, https://www.semtech.com/products/wireless-rf/lora-transceivers/sx1276, Semtech, 2016.
Semtech SX1276IMLIRT, https://www.mouser.com/ProductDetail/Semtech/SX1276IMLTRT?qs=rBWM4%252BvDhlceYQoeMKd%2FQQ%3D%3D, Mouser Electronics, 2016.
Sigfox Developers, https://www.sigfox.com/en/sigfox-developers, Sigfox, 2010.
Sigfox Products, https://radiocrafts.com/products/sigfox/#Documentation, Radiocrafts Embedded Wireless Solutions, 2017.
Sigfox Vs. Lora: A Comparison Between Technologies & Business Models, LinkLabs, May 2018, 15 pages.
The Alien Technology ALN-9640 Squiggle is a High-Performance General-Purpose RFID Inlay for Use in a Wide Variety of Applications, www.alientechnology.com, Feb. 7, 2014.
TI CC2650, http://www.digikey.com/product-detail/en/CC2650F128RHBR/CC2650F128RHBR-ND/5189550, Digi-Key Electronics, 2019.
USB-6361 Multifunction I/O Device, http://sine.ni.com/nips/cds/view/p/lang/en/nid/209073, National Instruments, 2015.
Afsahi, Ali et al., A Low-Power Single-Weight-Combiner 802.11 abg SoC in 0.13 µm CMOS for Embedded Applications Utilizing an Area and Power Efficient Cartesian Phase Shifter and Mixer Circuit, IEEE Journal of Solid-State Circuits, vol. 43, No. 5, May 2008.
Bandodkar, J. A. et al., Non-Invasive Wearable Electrochemical Sensors: A Review, Trends in in Biotechnology, Jul. 2014, vol. 32, No. 7, p. 363-371.
Ben-Jabeur, T. et al., Enhancing Passive UHF RFID Backscatter Energy Using Chirp Spread Spectrum Signals and Channel Shortening, IEEE Wireless Conference and Networking Conference, Apr. 2016.
Berni, J. A. et al., On the Utility of Chirp Modulation for Digital Signaling, IEEE Transactions on Communications, 21 (6): 748-751, Jun. 1973.
Bharadia, Dinesh et al., Backfi: High Throughput WiFi Backscatter, SigComm, Aug. 2015, p. 283-296.
Brandl, Martin et al., Long Range RFID Position Estimation for Applications in the Health Care System, IEEE 16th International Conference on e-Health Networking, Applications and Services (Healthcom), Oct. 2014, 2 pages.
Chawla, Vipul et al., An Overview of Passive RFID, IEEE Applications & Practice, Sep. 2007.
Chen, Tzung-Ming et al., A Low-Power Fullband 802.11a/b/g WLAN Transceiver With On-Chip PA, IEEE Journal of Solid-State Circuits vol. 42, No. 2, Feb. 2007.
Clarke, Ruthbea, Smart Cities and the Internet of Everything: The Foundation for Delivering Next-Generation Citizen Services, http://www.cisco.com/c/dam/en_us/solutions/industries/docs/scc/ioe_citizen_svcs_white_paper_idc_2013.pdf, IDC Government Insights, Oct. 2013.
Dayhoff, Steven, New Policies for Part 15 Devices, Federal Communications Commission Office of Engineering and Technology Laboratory Division TCBC Workshop, https://transition.fcc.gov/oet/ea/presentations/files/may05/New_Policies_Pt._15_SD.pdf, May 2005, 13 pages.
Ensworth, Joshua F. et al., Every Smart Phone is a Backscatter Reader: Modulated Backscatter Compatibility With Bluetooth 4.0 Low Energy (BLE) Devices, IEEE International Conference on RFID, Apr. 2015.
Hambeck, Christian et al., A 2.4µW Wake-Up Receiver for Wireless Sensor Nodes With -71 dBm Sensitivity, 2015 IEEE Topical Conference on Wireless Sensors and Sensor Networks (WiSNet), Jan. 2015, pp. 534-537.
He, Dr. Xiaoxi, Flexible, Printed and Thin Film Batteries 2019-2029, http://www.idtechex.com/en/research-report/flexible-printed-and-thin-film-batteries-2019-2029/634, Sep. 2018, 16 pages.
Hu, Pan et al., Laissez-Faire: Fully Asymmetric Backscatter Communication, SIGCOMM, Aug. 2015, pp. 255-267.
Iyer, Vikram et al., Inter-Technology Backscatter: Towards Internet Connectivity for Inmplanted Devices, SIGCOMM, Aug. 2016.
Jeremy, Gummeson et al., FLIT: A Bulk Transmission Protocol for RFID-Scale Sensors, 10th International Conference on Mobile Systems, Applications, and Services, MobiSys '12, Jun. 2012, pp. 71-83.
Kellogg, Bryce et al., Passive Wi-Fi: Bringing Low Power to Wi-Fi Transmissions, GetMobile: Mobile Computing and Communications, Jan. 2017, 14 pages.
Kellogg, Bryce et al., Wi-Fi Backscatter: Internet Connectivity for RF-Powered Devices, ACM SIGCOMM Computer Communication Review, Aug. 2014.
Kimionis, John, Bistatic Scatter Radio for Increased-Range Environmental Sensing, Technical University of Crete, A Thesis Submitted in Partial Fulfillment of the Requirements for the Master of Science of Electronic and Computer Engineering, Aug. 2013.
Lakdawala, Hasnain et al., A 32nm SoC With Dual Core Atom Processor and RF WiFi Transceiver, IEEE Journal of Solid-State Circuits, vol. 48, No. 1, Jan. 2013.
Lee, Chungyeol P. et al., A Multistandard, Multiband SOC With Integrated BT, FM, WLAN Radios and Integrated Power Amplifier, IEEE International Solid-State Circuits Conference, Feb. 2010.
Liao, Yu-Te et al., A 3-µW CMOS Glucose Sensor for Wireless Contact-Lens Tear Glucose Monitoring, IEEE Journal of Solid-State Circuits, vol. 47, No. 1, Jan. 2012.
Lingzhi, Fu et al., Collision Recovery Receiver for EPC GEN2 RFID Systems, IEEE International Conference on the Internet of things (IOT), Oct. 2012.
Liu, Vincent et al., Ambient Backscatter: Wireless Communication Out of Thin Air, SIGCOMM, Aug. 2013.
Lohr, Steve, The Internet of Things and the Future of Farming, The New York Times, http://bits.blogs.nytimes.com/2015/08/03/the-internet-of-things-and-the-future-of-farming/?_r=0, Aug. 3, 2015, 6 pages.
Mahdavifar, et al., Coding for Tag Collision Recovery, IEEE International Conference on RFID, Apr. 2015, 8 pages.
Malim, George, How IOT is Expanding Into Cosmetics and Medical Industries, http://www.iotglobalnetwork.com/iotdir/2016/03/22/how-iot-is-expanding-into-cosmetics-and-medical-industries-1203/, IoT Global Network, Mar. 22, 2016, 4 pages.
Morra, James, IoT Devices and Wearables Push Development of Thin, Flexible Batteries, http://electronicdesign.com/power/iot-devices-and-wearables-push-development-thin-flexible-batteries, ElectronicDesign, Sep. 18, 2015, 4 pages.
Nakamoto, et al., A Passive UHF RF Identification CMOS Tag IC Using Ferroelectric RAM in 0.35-µM Technology, IEEE Journal of Solid-State Circuits, vol. 42, No. 1, Jan. 2007.
Nathawad, et al., An IEEE 802.11a/b/g SoC for Embedded WLAN Applications, IEEE International Solid-State Circuits Conference, Feb. 2006, 10 pages.
LTE Evolution for IOT Connectivity, http:firesources.nokia.com/asset/200178, Nokia, Jul. 2016.
Ou, et al., Come and Be Served: Parallel Decoding for COTS RFID Tags, MobiCom'15, Sep. 2015, 12 pages.
Pandey, et al., A Fully Integrated RF-Powered Contact Lens With a Single Element Display, IEEE Transactions on Biomedical Circuits and Systems, vol. 4, No. 6, Dec. 2010.
Pantelopoulos, et al., A Survey on Wearable Sensor-Based Systems for Health Monitoring and Prognosis, IEEE Transactions on Systems, Man, and Cybernetics—Part C: Applications and Reviews, vol. 40, No. 1, Jan. 2010.
Parks, et al., Turbocharging Ambient Backscatter Communication, SIGCOMM, Aug. 2014, 12 pages.
Perez-Penichet, et al., Augmenting IoT Networks With Backscatter-Enabled Passive Sensor Tags, HotWireless'16, Oct. 2016, 5 pages.
Roberts, et al., A 98nW Wake-Up Radio for Wireless Body Area Networks, IEEE Radio Frequency Integrated Circuits Symposium, Jun. 2012, 4 pages.

(56) References Cited

OTHER PUBLICATIONS

Ru, et al., A Discrete-Time Mixing Receiver Architecture With Wideband Harmonic Rejection, IEEE International Solid-State Circuits Conference, Feb. 2008, 3 pages.
Sakurai, et al., A 1.5GHz-Modulation-Range 10MS-Modulation-Period 180KHZRMS-Frequency-Error 26MHz-Reference Mixed-Mode FMCW Synthesizer for MM-Wave Radar Application, IEEE International Solid-State Circuits Conference, Feb. 2011, 3 pages.
Sample, et al., Design of an RFID-Based Battery-Free Programmable Sensing Platform, IEEE Transactions on Instrumentation and Measurement, vol. 57, No. 11, Nov. 2008.
Smiley, Suzanne, Active RFID vs. Passive RFID: What's the Difference?, http://blog.atlasrfidstore.com/active-rfid-vs-passive-rfid, RFID Insider, Mar. 2016, 26 pages.
Talla, et al., Powering the Next Billion Devices With Wi-Fi, CoNEXT, Dec. 2015, 13 pages.
Thomas, et al., A 96 Mbit/Sec, 15.5 PJ/Bit 16-QAM Modulator for UHF Backscatter Communication, IEEE International Conference on RFID, Apr. 2012, 6 pages.
Varshney, et al., LOREA: A Backscatter Reader for Everyone!, arXiv.org, Nov. 2016, 15 pages.
Vougioukas, et al., Could Battery-Less Scatter Radio Tags Achieve 270-Meter Range?, IEEE, May 2016, 3 pages.
Wei, et al., High-Efficiency Differential RF Front-End for a GEN2 RFID Tag, IEEE Transactions on Circuits and Systems—II: Express Briefs, vol. 58, No. 4, Apr. 2011, 6 pages.
Weldon, et al., A 1.75-GHz Highly Integrated Narrow-Band CMOS Transmitter With Harmonic-Rejection Mixers, IEEE Journal of Solid-State Circuits, vol. 36, No. 12, Dec. 2001.
Wu, et al., A 56.4-to-63.4 GHz Multi-Rate All-Digital Fractional-N PLL for FMCW Radar Applications in 65 NM CMOS, IEEE Journal of Solid-State Circuits, vol. 49, No. 5, May 2014.
Yao, et al., A Contact Lens With Integrated Telecommunication Circuit and Sensors for Wireless and Continuous Tear Glucose Monitoring, Journal of Micromechanics and Microengineering, Jun. 2012, 10 pages.
Yeager, et al., A 9 µA, Addressable GEN2 Sensor Tag for Biosignal Acquisition, IEEE Journal of Solid-State Circuits, vol. 45, No. 10, Oct. 2010, 12 pages.
Yin, et al., A System-on-Chip EPC Gen-2 Passive UHF RFID Tag With Embedded Temperature Sensor, IEEE Journal of Solid-State Circuits, vol. 45, No. 11, Nov. 2010, 17 pages.
Zhang, et al., Enabling Bit-by-Bit Backscatter Communication in Severe Energy Harvesting Environments, Proceedings of the 11th USENIX Symposium on Networked Systems Design and Implementation, Apr. 2014, 14 pages.
Zhang, et al., Enabling Practical Backscatter Communication for On-Body Sensors, SIGCOMM, Aug. 2016, 14 pages.
Zhang, et al., Hitchhike: Practical Backscatter Using Commodity WiFi, SenSys, Nov. 2016, 13 pages.
Zheng, et al., Read Bulk Data From Computational RFIDs, IEEE/ACM Transactions on Networking, vol. 24, No. 5, Oct. 2016.

\* cited by examiner

BACKSCATTER SYSTEMS, DEVICES, AND TECHNIQUES UTILIZING CSS MODULATION AND/OR HIGHER ORDER HARMONIC CANCELLATION

CROSS-REFERENCE TO RELATED APPLICATION(s)

This application is a 35 U.S.C. § 371 National Stage Application of PCT Application No. PCT/US2017/057207, filed Oct. 18, 2017, which claims the benefit under 35 U.S.C. § 119 of the earlier filing date of U.S. Provisional Application Ser. No. 62/409,705 filed Oct. 18, 2016, and U.S. Provisional Application No. 62/465,977, filed Mar. 2, 2017, the entire contents of which are hereby incorporated by reference, in their entirety, for any purposes.

STATEMENT REGARDING RESEARCH & DEVELOPMENT

This invention was made with government support under Grant Nos. CNS-1305072, CNS-1452494, and CNS-1407583, awarded by the National Science Foundation (NSF). The government has certain rights in the invention.

TECHNICAL FIELD

Embodiments of the invention relate generally to backscatter systems and devices. Examples of backscatter devices that may provide backscatter signals including chirped spread spectrum signals are described. Examples of backscatter devices that may cancel one or more harmonic components of a backscatter signal are described, for example such device may switch between eight or more impedance values.

BACKGROUND

There is generally a disconnect between desirable ubiquitous connectivity and the capabilities of today's communication technologies. Radio technologies generally may provide reliable coverage and long ranges but are cost prohibitive for embedding into objects at scale. Further, given their high peak current and power requirements, radio technologies may not work with small batteries, such as emerging flexible, printed and ultra thin batteries.

Backscatter technologies may offer a low-power and low-cost alternative to radios. However, current backscatter designs may be limited in their range, and may not, for example, achieve robust coverage across rooms. Furthermore, since RF signals get significantly attenuated by the human body, backscatter range may be limited in a number of healthcare and wearable device applications.

SUMMARY

Examples of backscatter devices are described herein. An example backscatter device may include an antenna configured to backscatter a carrier signal having a first frequency, baseband circuitry configured to provide a frequency plan for chirp spread spectrum symbols for transmission, a frequency synthesizer coupled to the baseband circuitry and configured to provide an output signal in accordance with the frequency plan, and a switch coupled to the antenna, the switch configured to control an impedance of the backscatter device to backscatter the carrier signal in accordance with the output signal such that the first frequency is mixed with the output signal to transmit a chirp spread spectrum signal comprising the chirp spread spectrum symbols.

In some examples, the output signal comprises a square wave having a frequency changing over time in accordance with the frequency plan.

In some examples, the frequency synthesizer comprises a variable oscillator. In some examples, the variable oscillator comprises a voltage controlled oscillator. In some examples, a backscatter device may include a digital to analog converter coupled to the baseband circuitry and the voltage controlled oscillator, the digital to analog converter may be configured to translate the frequency plan to analog voltages and provide the analog voltages to the voltage controlled oscillator. In some examples, the digital to analog converter may include a bit resolution corresponding to a spreading factor used by the backscatter device.

In some examples, the frequency synthesizer comprises a direct digital synthesizer.

In some examples, the switch is configured to switch between eight impedance values of the backscatter device. In some examples, the switch is configured to backscatter the carrier signal such that a third harmonic of the chirp spread spectrum signal is suppressed.

In some examples, the chirp spread spectrum signal is arranged in accordance with a LoRa protocol.

In some examples, one of the chirp spread spectrum symbols comprises a signal having a linearly increasing frequency, and wherein another of the chirp spread spectrum symbols comprises a shifted version of the signal.

In some examples, the carrier signal comprises a spread spectrum signal, a frequency hopping signal, a single tone signal, or combinations thereof.

Another example of a backscatter device may include an antenna configured to backscatter a carrier signal having a first frequency, baseband circuitry configured to provide data for transmission, a modulator coupled to the baseband circuitry and configured to provide an output signal in accordance with the data, and a switch coupled to the antenna, the switch configured to control an impedance of the backscatter device to backscatter the carrier signal in accordance with the output signal such that the first frequency is mixed with the output signal to transmit a backscattered signal, wherein the backscattered signal has suppressed third and fifth harmonic components.

In some examples, the switch is configured to switch between eight impedance values of the backscatter device.

In some examples, the modulator is configured to perform amplitude modulation, phase modulation, frequency modulation, or combinations thereof.

In some examples, the data for transmission comprises chirp spread spectrum symbols and wherein the backscattered signal comprises a chirp spread spectrum signal.

Examples of systems are described herein. An example system may include a carrier signal generator configured to provide a carrier signal, a backscatter device, the backscatter device positioned to backscatter the carrier signal to provide a backscattered signal comprising a chirp spread spectrum signal, and a receiver configured to receive the chirp spread spectrum signal.

In some examples, the backscatter device and the receiver are separated by greater than 100 meters.

In some examples, the backscatter device comprises a dermal patch or a contact lens.

In some examples, the carrier signal generator and the receiver are integrated into a same hybrid device. In some examples, the same hybrid device is configured to implement full duplex communication.

In some examples, the system may further include a plurality of backscatter devices, wherein each of the plurality of backscatter devices is configured to backscatter the carrier signal into a respective different channel.

DETAILED DESCRIPTION

Figure 1:
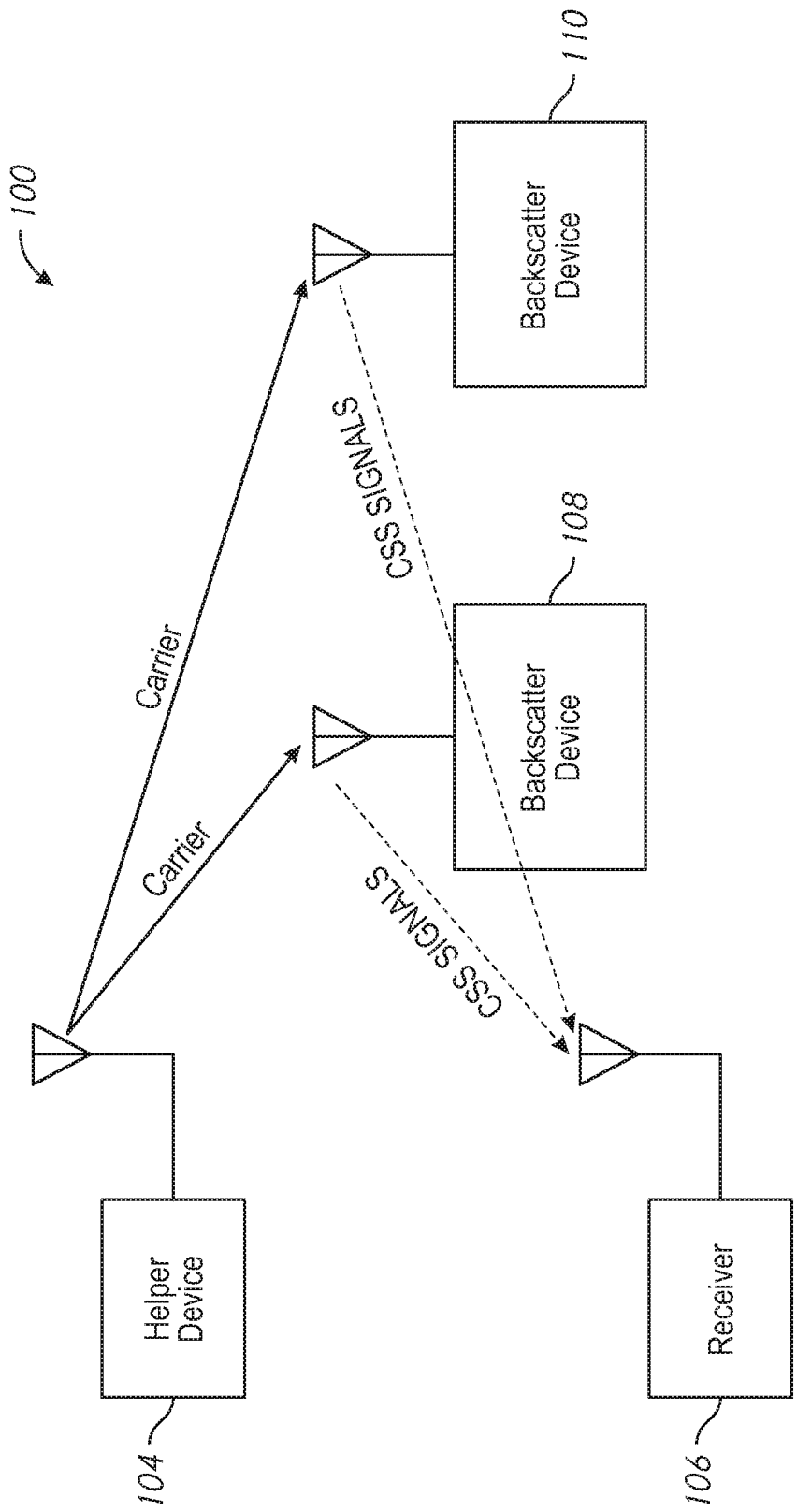
FIG. 1 is a schematic illustration of a system arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples described herein may provide devices and systems which may be capable of long-range reliable communication capabilities, such as those of radios, but at the generally lower-cost and power of backscatter technology. Accordingly, examples of devices and systems described herein may provide wide area connectivity for everyday objects and may open up applications in domains like smart cities, precision agriculture, industrial, medical and whole-home sensing, where backscatter technologies may have previously been infeasible.

Wide-area backscatter systems may have previously been difficult for a variety of reasons. For example, a backscatter device may reflect signals from an RF source (e.g., a helper device) that are then decoded by a receiver. Note that, before arriving at the backscatter device, the signals from the RF source may already be attenuated. The backscatter device reflects these weak signals that get further attenuated as they propagate to the receiver. The direct signal from the RF source at the receiver may be significantly stronger. Thus, the backscattered signal may be not only drowned by noise but also may suffer significant interference from the RF source.

Examples described herein may include wide-area backscatter communication systems (e.g., systems capable of backscattering a signal over 10s of meters in some examples, 100s of meters in some examples, kilometers in some examples). Examples described herein may utilize chirp spread spectrum (CSS) modulation to generate backscattered signals which may be received at these distances. The backscattered signals may, for example, be arranged in accordance with a LoRa protocol. Generally, an RF source (e.g., a helper device) may transmit a carrier signal, which may be a single tone signal, One or more backscatter devices may utilize the carrier signal to synthesize CSS signals, e.g., LoRa compatible packets.

Accordingly, examples described herein may use CSS modulation, e.g., using a LoRa protocol. Generally, CSS modulation may represent a bit as a chirp (e.g., frequency-changing waveform) which has a particular frequency pattern. For example, a 0 bit may be represented as a continuous chirp that increases linearly with frequency. A 1 bit may be represented by a chirp that is cyclically shifted in time. In this manner, CSS signals generally may continuously change a frequency as a function of time. Example backscatter devices described herein may synthesize continuous frequency modulated chirps.

Examples described herein may utilize a harmonic cancellation (and/or reduction) mechanism. Generally, backscatter devices may utilize a switch to switch between impedances of the backscatter device. However, the use of the switch may create harmonics (e.g., third and fifth harmonics) in other frequency bands. The presence of these harmonic signals may result in interference and may affect network performance. Examples described herein may cancel (e.g., eliminate and/or reduce) the third and/or fifth harmonics.

FIG. 1 is a schematic illustration of a system arranged in accordance with examples described herein. The system 100 includes helper device 104, receiver 106, backscatter device 108, and backscatter device 110. During operation, the helper device 104 transmits a carrier signal. The backscatter device 108 and/or backscatter device 110 may backscatter the carrier signal into a backscattered signal. Examples of backscattered signals include those that may be compliant with a wireless communication protocol, such as an orthogonal frequency division multiplexing (OFDM) signal, Bluetooth signal, Zigbee signal, or other data-carrying signal. In some examples described herein, the backscattered signal may be a chirp spread spectrum signal (CSS signal), such as a chirp spread spectrum signal compliant with a LoRa protocol. The transmissions from the backscatter device 108 and/or backscatter device 110 may be received by the receiver 106. In this manner, the receiver 106 may be any electronic device that is capable of receiving the backscattered signal (e.g. a wireless communication device) arranged in the protocol transmitted by the backscatter device 108 and/or backscatter device 110, e.g. chirp spread spectrum signal. Accordingly, backscatter devices may transmit to conventional electronic devices (e.g. wireless communication devices) using wireless communication protocols.

Chirp spread spectrum signals generally refer to wireless communication signals having data encoded using chirp spread spectrum symbols. The chirp spread spectrum signals may include a frequency variation.

OFDM signals generally refer to wireless communication signals having data encoded using orthogonal frequency division multiplexing techniques on multiple frequencies. OFDM signals are used in the Institute of Electrical and Electronics Engineers' 802.11 Wi-Fi standards, such as but not limited to, 802.11b, 802.11g, 802.11ac, and/or 802.11ah. OFDM signals may also be used to implement mobile communication standards, such as 4G Long-Term Evolution (LTE), The helper device 104, which may also be referred to as an RF source and/or carrier signal generator, may be implemented using any electronic device capable of providing carrier signals (e.g. wireless communication device) described herein. The helper device 104 may be implemented using generally any RF source (e.g., device capable of generating a radio frequency signal). Examples of helper devices include, but are not limited to, routers, mobile communications devices such as cell phones or tablets, computers, and/or laptops. The helper device 104 may generally have a wired power source, although in some examples the helper device 104 may be battery powered. Generally, the helper device 104 may have sufficient power to generate the carrier signal. A single helper device may provide a carrier signal to more than one backscatter device as described herein. Although a single helper device 104 is shown in FIG. 1, any number of helper devices may be used in some examples. Although helper device 104 is shown as separate from receiver 106 in FIG. 1, in some examples the helper device 104 and the receiver 106 may be integrated into a same hybrid device (e.g., the helper device 104 and receiver 106 may transmit and receive signals, respectively, using one or more shared antennas).

The helper device 104 generally includes RF components, such as frequency synthesizer(s) and/or power amplifiers, which may then not be needed at the backscatter device 108 and/or backscatter device 110. In this manner the helper device 104 may provide the RF functions for any number of backscatter devices, such as backscatter device 108 and backscatter device 110.

The carrier signal provided by the helper device 104 may be any of a variety of wireless signals which may be backscattered by the backscatter device 108 and/or backscatter device 110 to form backscattered signals (e.g., CSS signals). The carrier signal may be a continuous wave signal. In some examples, one or more characteristics of the continuous wave signal (e.g. the frequency, amplitude, and/or phase) may be selected in accordance with a particular wireless protocol and/or frequency and/or amplitude and/or phase that the receiver 106 is configured to receive. For example, a frequency of the carrier signal may be selected such that, when a frequency shift is provided by backscatter device 108 and/or backscatter device 110, a backscatter is generated at a frequency that the receiver 106 is configured to receive. In some examples, the carrier signal may be a single-frequency tone signal. In some examples, the carrier signal may be a data-free signal. For example, data decodable by the receiver may not be encoded in the carrier signal. In other examples, the carrier signal may be an ambient signal which may be data carrying e.g., a television, WiFi, or other wireless communication signal). The carrier signal may in some examples be a hopped frequency signal. The carrier signal may in some examples itself be a CSS signal (e.g., include one or more CSS symbols, such as a repeated baseline symbol).

The backscatter device 108 and backscatter device 110 may be implemented using and/or together with any devices having backscatter communication capability, such as, but not limited to, tags, mobile communication devices such as cell phones or tablets, computers, and/or laptops. Other devices may be implemented having backscatter communication capability, including but not limited to sensors, wearable devices such as watches, eyeglasses, contact lenses, dermal patches and/or medical implants. It is anticipated that the backscatter devices may have a sufficiently small form factor and low power requirement as to be able to be incorporated in or attached to any object and provide communication functionality for the object and/or associated with the object. In this manner, backscatter devices may be placed ubiquitously in an environment, and facilitate Internet of Things (IoT) and/or other ubiquitous sensor functionality. Although two backscatter devices are shown in FIG. 1, it is to be understood that any number of backscatter devices may be used, including one backscatter device. In other examples, 10, 20, 30, 40, 50, 60, 70, 80, 90, 100 or more backscatter devices may be present in the system 100.

Generally, backscatter devices, such as the backscatter device 108 and backscatter device 110 function to present varying impedance to a carrier signal such that, for example, various manipulations (e.g. absorption, reflection, etc.) to the carrier signal are performed, and the carrier signal may be backscattered into a data-carrying signal encoding data provided by one or more of the backscatter device(s). Accordingly, in some examples, a data-carrying signal may be provided through backscatter using only the energy required to alter impedance at a backscatter device's antenna. In this manner, the backscatter devices may transmit data-carrying signals at lower power than if the backscatter devices had themselves generated the carrier signals.

Backscatter devices described herein, such as backscatter device 108 and backscatter device 110 may generally be ultra-low power devices. For example, backscatter devices described herein may eliminate or reduce the need for power hungry communication components (e.g. RF signal generators, mixers, analog-to-digital converters, etc., which may be present in the helper device 104). In this manner, backscatter devices described herein may consume microwatts of power to transmit data, which may improve the battery life of the component (e.g. sensor) utilizing the communication capability of the backscatter device. Backscatter devices may perform digital baseband operations, such as coding and/or modulation.

The backscatter signals backscattered by the backscatter device 108 and/or backscatter device 110 may be signals which encode data in accordance with CSS or other techniques. in some examples, the backscattered signal may include one or more CSS symbols or packets, or symbols or packets of other protocol(s), decodable at the receiver 106 based on a particular protocol or standard implemented by the receiver 106. In some examples, the backscattered signal may include data detected at the backscatter device 108 and/or backscatter device 110 (e.g. by a sensor of the backscatter device 108 and/or backscatter device 110).

Backscatter devices and/or helper devices described herein, such as backscatter device 108, backscatter device 110, and/or helper device 104, may each include multiple antennas. In this manner, antenna diversity may be leveraged and multiple-input-multiple-output (MIMO) techniques may be used. For example, the helper device 104 may distribute the carrier signal across multiple antennas based on the wireless channel, which may improve wireless signal propagation from the helper device 104 to the backscatter device 108 and/or 110 to the receiver 106.

The receiver 106 may be implemented using any electronic device capable of receiving the backscattered signals (e.g., CSS signals). Generally, any electronic device (e.g. wireless communication device) may be used to implement receiver 106 including, but not limited to, access points, routers, hubs, mobile communications devices such as cell phones or tablets, computers, and/or laptops. In some examples, the helper device 104, receiver 106, and backscatter device 108 and/or backscatter device 110 may be physically separate devices.

While shown as a separate device from the helper device 104, in sonic examples the helper device 104 and receiver 106 may be integrated and/or may be the same device. For example, an electronic device may include multiple antennas in some example. One or more antennas in some examples may provide the carrier signal (e.g. provide the helper device 104) while one or more antennas, different from those providing the carrier signal in some examples, may receive the signal transmitted by one or more backscatter devices (e.g. provide the receiver 106). In some examples, one or more of the antennas may be shared between transmit and receive functionality. In some examples, the helper device and the receiver may be integrated into a single device. Cancellation circuitry may be provided in the integrated device to suppress (e.g. cancel) the carrier signal transmitted by the helper device at the receiver.

The receiver 106 may receive transmission from the backscatter device 108 and/or backscatter device 110 in the presence of interference from the carrier signal transmitted by the helper device 104. In some examples, specialized hardware may be used by the receiver 106 (e.g. a full-duplex radio) to cancel this interfering signal, however that may not be compatible with existing Wi-Fi devices. In some examples, the helper device 104 may provide a carrier signal that is made up of frequencies (e.g. a single-frequency tone or a multi-frequency signal) outside a desired frequency channel for the transmissions of the backscatter device 108 and/or backscatter device 110. This may ensure and/or aid in the receiver 106 suppressing the out-of-band interference from the helper device 104.

The helper device 104 and receiver 106 described herein may change functionality from time to time in some examples. For example, while the helper device 104 at may function as described with reference to a helper device, the helper device 104 may at times function as a receiver in some examples, while the receiver 106 may function as a helper device at times. For example, a router (e.g. a Wi-Fi router) may be used having multiple modes of operation. In one mode of operation, the router may be used to implement the helper device 104, while in another mode, the router may be used to implement the receiver 106. The same device can time multiplex its functionality in some examples, such that the helper device 104 may be integrated and/or incorporated with the receiver 106.

In some examples, multiple helper devices and/or receivers may be present in a system. In some examples, a single device (e.g. a router) may serve as a helper device at certain times and as a receiver at other times. In some examples, multiple (e.g. two) devices may be present in a system, each able to serve as either a helper device or a receiver. For example, the device may function as a helper device be configured to transmit a carrier signal) in one mode, and a receiver (e.g. be configured to receive a backscattered signal) in a second mode. Accordingly, the two devices may trade off serving as the helper device at any instance of time. For example, at one time Router 1 may function as the helper device whereas Router 2 may function as the receiver and at another time instant the roles may be reversed. Different time allocations may be used in some examples and a larger number of routers may be present in some examples.

In examples having multiple helper devices and/or receivers, the helper devices and/or receivers may be positioned across an area to maximize and/or improve spatial coverage by the carrier signal and/or spatial coverage for receipt of backscattered signals. In some examples, a helper device of the plurality of helper devices in a system may be selected to act as a helper device (in some examples, the selection may be specific to a specific backscatter device or group of backscatter devices) based on proximity of the candidate helper device to the backscatter device. In some examples, the selection may be made based on a candidate helper device of the plurality of helper devices having a better reception of a backscattered signal than another of the plurality of helper devices.

In some examples, backscatter devices (e.g., backscatter device 108 and/or backscatter device 110) may be positioned a significant distance from a receiver (e.g., receiver 106). For example, use of CSS signals in a backscatter signal may allow the backscatter signal to be received by a receiver which is up to 2.8 km away in some examples, up to 2.5 km in some examples, up to 2 km in some examples, up to 1.8 km in some examples, up to 1.5 km in some examples, up to 1 km in some examples, up to 0.8 km in some examples, up to 0.5 km in some examples, up to 250 m in some examples, up to 100 m in some examples, up to 75 m in some examples, up to 50 m in some examples, up to 25 m in some examples, up to 10 m in some examples. Other distances may be used in other examples. This may allow a receiver to receive backscattered signals from one or more backscatter devices placed throughout a large area (e.g., building, geography).

Examples described herein may utilize backscatter devices to generate backscattered signals having any of a variety of formats. In some examples, backscattered signals described herein may be generated using CSS modulation, and may include one or more CSS symbols. CSS generally refers to the use of linear frequency modulated chirp pulses to convey information. Generally, CSS may utilize a time delay in the chirp signal to translate to a frequency shift at an output of a receiver transform (e.g., FFT). CSS modulation may refer to the use of this relationship to encoded data utilizing cyclic time shifts in a baseline chirp.

Figure 2:
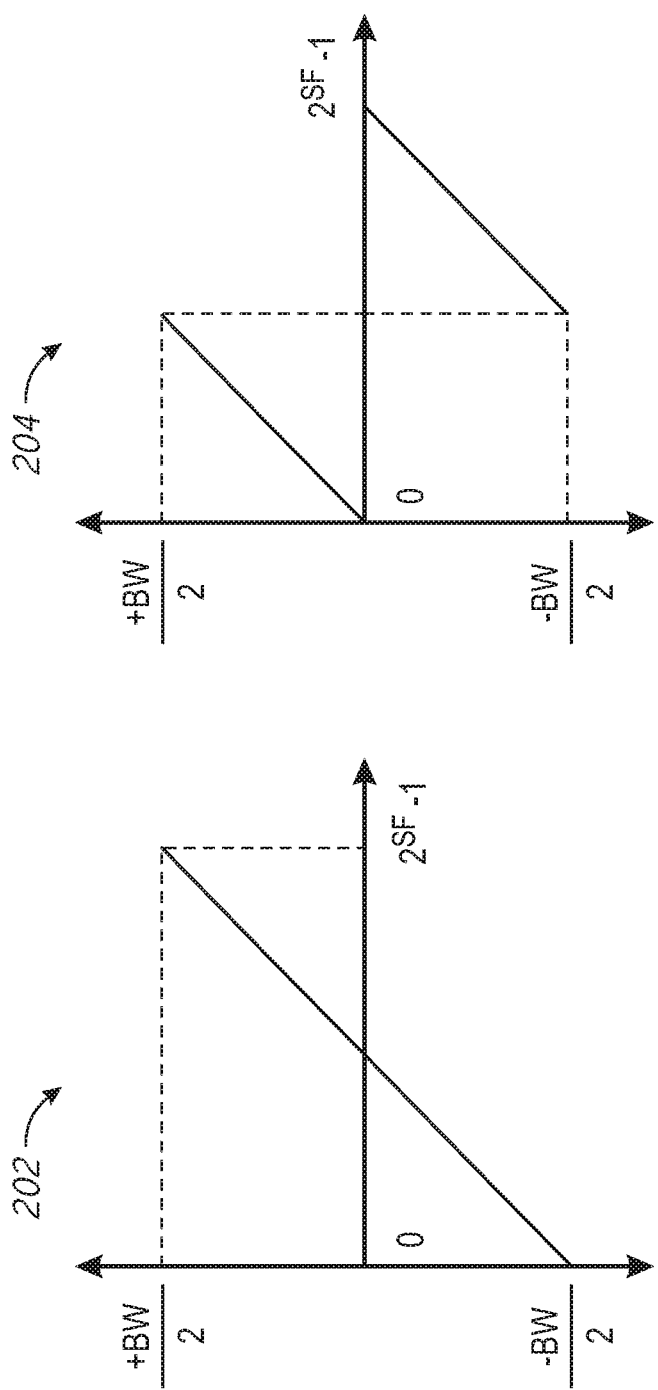
FIG. 2 is a schematic illustration of example CSS symbols arranged in accordance with examples described herein.

FIG. 2 is a schematic illustration of example CSS symbols arranged in accordance with examples described herein. FIG. 2 depicts symbol 202 and symbol 204. Additional and/or different symbols may be used in other examples. In the example of FIG. 2, symbol 202 may be indicative of a baseline chirp. Symbol 204 may be indicative of a cyclic shifted chirp, offset by half of a chirp duration. The plots shown in FIG. 2 illustrate frequency on the y axis over time on the x axis. These symbols may be provided by backscatter devices described herein, such as backscatter device 108 and/or backscatter device 110 of FIG. 1.

A receiver (e.g., receiver 106 of FIG. 1) may demodulate symbol 202 and/or symbol 204 by multiplying the incoming signal with the baseline chirp and then performing a transform (e.g., an FFT). Since multiplication in the time domain is correlation in the frequency domain, the operation results in a peak in the FFT frequency bin corresponding to the time delay in the received chirp. The position of the peak may be used to discriminate between CSS symbols. Thus, by tracking peaks, receivers described herein may decode data from CSS signals.

In some examples, multiple bits of data may be transmitted within each chirp symbol. For example, the receiver may perform an N point FFT. The receiver may then distinguish between N different cyclic shifts which result in a peak in each of the N FFT bins. Thus, $\log_2 N$ bits may be transmitted within each chirp. In FIG. 2, N is set to 2 SF, where SF is the spreading factor of CSS modulation. Generally, there may be three parameters that may influence the bit rate achieved while using CSS modulation: 1) chirp bandwidth, 2) spreading factor and 3) symbol rate. As shown in FIG. 2, where BW denotes the bandwidth, the frequency of the baseline chirp increases linearly between (−BW/2) and (+BW/2). The data bits may be encoded as cyclic shifts of this baseline chirp, where each cyclic shift represents a modulated symbol, The spreading factor, SF, may refer to a number of bits encoded in each chirp duration. A chirp with N samples may encode $\log_2 N$ bits. Thus, a CSS chirp with a spreading factor SF may have 2SF samples. Lastly, the symbol rate refers to the number of chirp symbols per time period (e.g., second).

With a bandwidth of BW, the Nyquist sampling rate is (1/BW) samples per second. Given a spreading factor of SF, the length of each symbol may be given by $2^{SF}$/BW seconds and the symbol rate may be given as BW/$2^{SF}$ symbols per second. Since each chirp may represent SF bits, the bit rate may be written as (BW/$2^{SF}$)SF. In this manner, different bit rates may achieved in examples described herein by selecting a bandwidth and/or a spreading factor. In examples utilizing a LoRa protocol, error coding codes may be used in addition to CSS modulation, which may provide a third degree of freedom, in addition to chirp bandwidth and spreading factor, to select bit rate of backscatter signal transmission.

Figure 3:
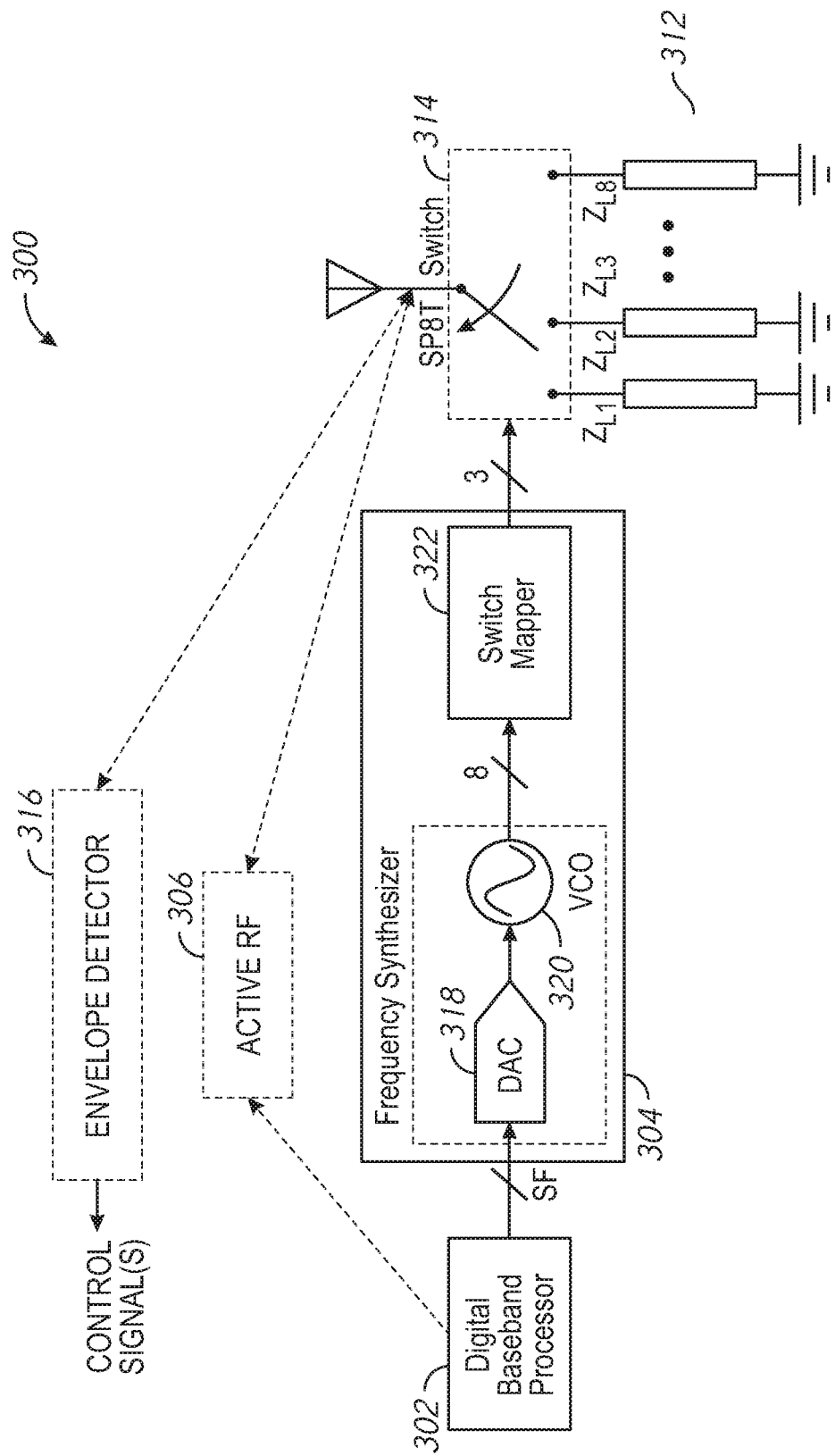
FIG. 3 is a schematic illustration of a backscatter device arranged in accordance with examples described herein.

FIG. 3 is a schematic illustration of a backscatter device arranged in accordance with examples described herein. The backscatter device 300 may be used to implement, for example, the backscatter device 108 and/or backscatter device 110 of FIG. 1. The backscatter device 300 includes baseband circuitry 302, modulator 304, active RF 306, impedances 312, switch 314, and envelope detector 316. The modulator 304 may include digital to analog converter 318, voltage controlled oscillator 320, and switch mapper 322. In other examples, additional, fewer, and/or different components may be used.

Generally, backscatter devices may operate by changing an impedance of the backscatter device (e.g., changing an impedance coupled to an antenna of the backscatter device). A single antenna is shown in the backscatter device 300 of FIG. 3, however in other examples, multiple antennas may be used. The antenna may backscatter a carrier signal incident on the antenna as described herein. The switch 314 may be used to toggle between multiple impedance values for the backscatter device 300. For example, the switch 314 is positioned to connect an antenna of the backscatter device 300 to a selected impedance value of a plurality of available impedance values on the backscatter device 300. Note that the switch 314 may be implemented using multiple switches (e.g., a network of switches).

Impedance values are shown as impedances 312 in FIG. 3. Eight impedance values are shown in FIG. 3, however other numbers of impedances may be used in other examples. Two, four, eight, sixteen, or thirty-two impedance values may be used. in some examples. The switch 314 may be used to toggle between available impedance values to backscatter a carrier signal incident on the antenna of the backscatter device 300. In some examples, two impedance values may be used (e.g., the switch 314 may be coupled to ground or may be open). In some examples, four impedance values may be used. In examples utilizing four impedance values, the backscattered signal may be present in a single sideband. In some examples, eight impedance values may be used. In examples utilizing eight impedance values, a third and/or fifth harmonic component of the backscattered signal may be cancelled and/or reduced. In some examples, more impedance values may be used, and additional higher harmonic components of the backscattered signal may be cancelled and/or reduced.

Generally, the backscatter device 300 may shift a frequency of a carrier signal to generate a backscattered signal. For example, the frequency may be shifted from a single-frequency tone provided as a carrier frequency, which may be a frequency outside of a desired transmission channel (e.g., outside of the preferred band for a particular protocol) to the desired transmission channel (e.g., the center frequency of the desired. Wi-Fi transmission channel). The frequency-shifted signal may be used to provide wireless communication signal (e.g. CSS signals and/or Wi-Fi signals). Generally, to shift the frequency of the carrier signal, the switch 208 may be operated at a frequency Af equal to an amount of desired frequency shift. Digital encoding may be performed using digital logic and phase changes may be implemented in some examples by modifying a phase of a square wave (e.g. used to approximate a sine wave). In this manner, the digital backscatter device 200 may synthesize wireless communication signals (e.g. CSS signals and/or Wi-Fi signals) while operating in the digital domain at baseband.

Referring back to FIG. 1, note that a receiver (e.g., receiver 106) may receive both the carrier signal (e.g., single-tone signal) from the helper device 104 as well as the backscattered CSS signals from, e.g., backscatter device 108 and/or backscatter device 110. Since the backscatter signal may be much weaker, the single-tone creates in-band interference at the receiver 106. To aid in addressing this, examples of backscatter devices described herein may shift the single-tone outside the desired band and transform it into out-of-band interference. For example, if the helper device 104 transmits the single-tone signal $e^{2\pi f_c t}$ and the backscatter signal generates the complex signal, $e^{2\pi(\Delta f + f_{LoRa})t}$, then the resulting backscattered RF signal may be expressed as $e^{2\pi((f_c + \Delta f) + f_{LoRa})t}$. Δf may be a small fixed offset and $f_{LoRa}$ may be the varying frequency corresponding to the baseband LoRa modulation. In this manner, using a small frequency offset, Δf, the CSS signal (e.g., LoRa signals) may be created in a band centered at $f_c$+Δf which is different from that of the single tone $f_c$. Accordingly, the voltage controlled oscillator 320 frequencies may be at Δf+/−frequency variations to create CSS symbols.

During operation, the baseband circuitry 302 may provide data to the modulator 304. The modulator 304 may provide output signals to the switch 314. A frequency of the output signals may be selected as a difference between a frequency of the carrier signal and a desired frequency of the backscatter signal (e.g., frequency at which a receiver may receive the backscatter signal). The data may be provided in the backscatter signal in several ways. In some examples, the modulator 304 may control the switch 314 to reflect and/or absorb portions of the carrier signal (e.g. packets) in accordance with the data. For example, packets of the carrier signal may be reflected to indicate a '0' and absorbed to indicate a '1', or vice versa. In some examples, the modulator 304 may alter a phase, amplitude, frequency or combinations thereof of a waveform to provide output signals. The output signals may be used to control switch 314 to backscatter a carrier signal into a data-carrying signal formatted in accordance with a wireless communication protocol utilizing phase-shift keying, a wireless communication protocol using amplitude-shift keying, a wireless communication protocol utilizing chirp spread spectrum, or combinations thereof.

The modulator 304 may provide a waveform at a frequency which may be selected to be a frequency equal to a difference between a frequency of the carrier signal and a desired frequency for transmission of a backscattered signal.

The modulator 304 may control the switch 314 at the frequency of the waveform provided by the modulator 304 which may effectively mix the frequency of the carrier signal with the frequency of the waveform, resulting in a backscattered signal at a frequency of the carrier signal+/−the frequency of the waveform. As described herein, in some examples, the modulator 304 may provide one or more square waves at a desired frequency—each shifted in phase relative to the other. Moreover, the complement of those square waves may also be provided by the modulator 304, and may be digitally generated from the initial square waves, for example. For example, the modulator 304 may provide two square waves, each shifted one quarter phase relative to the other. Complements of the two square waves may also be provided, such that four square waves, each shifted one-quarter phase from one another are provided. The backscatter device may utilize the four square waves as control signals for one or more switches such that, at each quarter period, the backscatter device may switch between multiple (e.g. four) impedances. Switching between four impedances may allow the backscatter device to generate a backscatter signal is generated in a single sideband. In other examples, the modulator 304 may provide multiple shifted square waves and the backscatter device may switch between multiple (e.g., eight) impedances such that a third and/or fifth harmonic component of a backscattered signal is cancelled and/or suppressed. For example, the modulator 304 may provide four square waves, each shifted one-eighth of a period from one another, and their complements, such that eight square waves may be used, each shifted one-eighth of a period from one another. The eight signals may be used as control signals to toggle an impedance of the backscatter device between eight impedances each period. Generally, a backscattered signal at a desired frequency may be achieved by providing a waveform to the modulator 304 having a frequency equal to a difference between the frequency of the carrier signal and the desired frequency of backscatter transmission. That frequency may change over time, such as when generating a backscattered CSS signal.

While described as a square wave, in some examples, any periodic waveform may generally be used by the modulator 304 including, but not limited to, a square wave, sine wave, cosine wave, triangle wave, sawtooth wave, analog signal, multi-level signal, or combinations thereof. The modulator 304 may be implemented using, hardware, software, or combinations thereof. For example, the modulator 304 may be implemented using an oscillator, such as a variable oscillator, such as a voltage controlled oscillator 320. In some examples, the modulator 304 may be implemented using an FPGA, DSP, and/or microprocessor and executable instructions to provide the desired waveform at the desired frequency.

Baseband circuitry 302 may be implemented using typical baseband circuitry for the wireless communication protocol of interest, e.g. Wi-Fi baseband circuitry and/or CSS baseband circuitry. Generally, the baseband circuitry 302 includes digital circuitry components which may be relatively low power. The baseband circuitry 302 may provide encoding in accordance with the wireless communication protocol of interest (e.g. DSSS and CCK encoding for 802.11b transmissions, a frequency plan for chirped spread spectrum signals). The data provided by the baseband circuitry 302 may originate from one or more sensors which may be coupled to and/or integrated with the backscatter device 300 in some examples. Any number of sensors may be used, including but not limited to, temperature sensors, vibration sensors, humidity sensors, glucose sensors, pH sensors, blood oxygenation sensors, GPS sensors, optical sensors, cameras, and/or microphones. In this manner, sensor data may be provided that may be transmitted by the backscatter device 300.

Although not shown in FIG. 3, the backscatter device 300 may include a power source, such as a battery and/or energy harvesting system. The battery may be implemented using a lithium ion battery, one or more printed batteries, one or more button and/or coin batteries, or combinations thereof. In some examples additionally or instead, energy harvesting components may be provided to power all or portions of the backscatter device 300, including, but not limited to, components for harvesting solar energy, thermal energy, vibrational energy, or combinations thereof. The power source may power the baseband circuitry 302 and/or modulator 304. In some examples, active RF 306 may be used when a larger power source than the power source used to power those backscatter components is available (e.g. a wired power source).

The modulator 304 may be implemented using circuitry that may adjust a phase, amplitude, frequency, or combinations thereof of a waveform. in some examples, an FPGA may be used to implement modulator 304. The modulator 304 may be coupled to the baseband circuitry 302 and may receive data (e.g., a frequency plan) from the baseband circuitry 302. The modulator 304 may alter a phase, amplitude, or both, of a waveform in accordance with the data from the baseband circuitry 302 to provide one or more output signals. The modulator 304 may be coupled to the switch 314 and may provide the output signals to the switch 314.

Some example backscatter devices may additionally include active rf 306 components such that in one mode, the backscatter device 300 may backscatter signals and have low power e.g. backscatter) operation, while in another mode the backscatter device 300 may utilize active rf 306 to transmit wireless communication signals conventionally (e.g. generating the device's own carrier signal). The backscatter components and active RF 306 may utilize a same antenna, as shown in FIG. 3, and the antenna connection may be switched between the active RF 306 and modulator 304 in some examples by control circuitry (not shown in FIG. 3), In other examples, the active RF 306 and modulator 304 may utilize different antennas.

The antenna may be connected to a switch (not shown) which selects between the active RF 306 radio and the modulator 304. The selection may be made, for example, on a basis of proximity to a carrier signal generator (e.g., helper device). In some examples, when the backscatter device 300 is in the range of a helper device it may couple the modulator 304 to the antenna to perform low power transmissions (e.g. transmission of CSS signals). However, when the backscatter device 300 is outside the range of the helper device, the antenna may be coupled to active RF 306.

Switch 314 may be implemented using generally any circuitry for altering impedance presented to an antenna, such as a transistor. The switch 314 is coupled. between the modulator 304 and an antenna of the backscatter device 300. In the example of FIG. 3, the switch 314 is implemented using a transistor or network of transistors. Any of a variety of antenna designs may be used. The antenna may be operational in the frequency of the carrier signal and the frequency of the backscatter signal. A high output signal provided by the modulator 304 to the gate of the switch 314 accordingly may turn the transistor on, presenting a low impedance to the antenna. A low output signal provided by the modulator 304 to the gate of the switch 314 accordingly may turn the transistor off, presenting a high impedance to the antenna. In some examples a multi-bit signal is provided to the switch 314 to control a sequence of impedances presented to the antenna such as three bits as shown in FIG. 3 to control the sequencing of eight impedance values. The switch 314 may generally run at a baseband frequency—e.g. a much lower frequency than a frequency of a carrier signal provided to the backscatter device 300. In some examples, the switch 314 may be operated at a frequency of 50 MHz or lower, although other frequencies may also be used in other examples. The switch 314 may allow for different impedances to be coupled to the antenna of the backscatter device, such as the impedances 312. In the example of FIG. 3, the impedances 312 may be provided in parallel and the switch 314 may couple a selected one of the impedances 312 at a time to the antenna. In other examples, the switch 314 may be provided in parallel, and one or more switches may be provided to add and/or remove impedance elements from being coupled to the antenna. The impedances 312 may generally be implemented using any components having an impedance including, but not limited to, one or more resistors, capacitors, and/or inductors.

While shown as a single switch in FIG. 3, the switch 314 may be implemented as a network of switches (e.g., three cascaded switches may be used to implement the switch 314).

In some examples, the backscatter device 300 may further include a receiver for receiving signaling message from, e.g. the helper device 104. In examples described herein, the helper device 104 may provide signaling packets which may, for example, be created using amplitude modulation such as ON/OFF keying. The backscatter device 300 may include a passive energy detector (e.g., envelope detector 316) with analog components and a comparator to distinguish between the presence and absence of energy. In this manner, signaling packets may be received while consuming low power, 18 mW in some examples.

Data may be provided in the backscatter signal in several ways. In some examples, such as in some examples where the carrier signal includes packets or other data (e.g. a Wi-Fi, ZigBee, CSS, and/or SigFox signal), data may be provided in the backscatter signal by reflecting and/or absorbing portions (e.g. packets) of the carrier signal in accordance with the data to be transmitted. A receiver may decode the presence of a packet in the backscatter signal as a '1' (or a '0' in some examples) and the absence of a packet in the backscatter signal as a '0' (or a '1' in some examples).

In some examples, data may be provided in the backscatter signal by altering a phase, amplitude, frequency, or combinations thereof of a waveform provided to the modulator in accordance with the data to perform phase-shift keying, amplitude-shift keying, and/or chirp spread spectrum. In this manner, the backscatter device 200 may create wireless communication transmissions (e.g. which may be arranged in accordance with a standard wireless communication protocol, such as but not limited to LoRa, CSS, Wi-Fi 802.11a, 802.11b, 802.11g, 802.11n, ZigBee, and/or Bluetooth). Since the backscatter device 200 has no (or fewer) analog components, it may generally consume less silicon area and be smaller and cheaper than existing transmission devices, such as Wi-Fi chipsets. Further, its power consumption may be significantly lower as it may only have a need to perform digital baseband operations.

Generally, the carrier signal may have a particular frequency—e.g. a single tone, a frequency used in LoRa, Bluetooth, Wi-Fi, ZigBee, and/or other wireless communication protocol. It may be desirable for the backscatter device 300 to transmit a backscattered signal at a particular frequency (e.g. at a frequency used in LoRa, Bluetooth, Wi-Fi, ZigBee, or other wireless communication protocol). It may be desirable for the backscattered signal to occur at a different frequency than the carrier signal, for example to avoid or reduce interference between the carrier signal and the backscattered signal.

In examples utilizing chirp spread spectrum, the modulator 304 may include a digital to analog converter 318, a variable oscillator (e.g., voltage controlled oscillator 320), and a switch mapper 322. The baseband circuitry 302 may provide a frequency plan for chirp spread spectrum symbols for transmission. :For example, the baseband circuitry 302 may provide data regarding a frequency pattern for each symbol to be transmitted by the backscatter device 300. The symbols may be selected in accordance with data desired to be transmitted by the backscatter device 300. For example, one symbol may be indicative of a '1' while another may be indicative of a '0'.

Generally, a frequency synthesizer may be used to provide output signals in accordance with a frequency plan provided by the baseband circuitry 302. The frequency plan generally refers to a sequence of frequencies to be included in a transmitted CSS signal (e.g., the sequences of frequencies shown in FIG. 2 and/or FIG. 4). The modulator 304 may be used to implement a frequency synthesizer to achieve output signals indicative of frequency adjustments (e.g., $\Delta f$) to a carrier signal which may be used to generate the CSS symbols for transmission. In some examples, output signals may be implemented using one or more square waves having a frequency changing over time in accordance with the frequency plan. The switch 314 may control an impedance of the backscatter device (e.g., by selecting one or more of the impedances 312) to backscatter the carrier signaling accordance with the output signals such that the carrier signal frequency is mixed with the output signal to transmit a chirp spread spectrum signal including the CSS symbols. In some examples, the output signals may include four square waves, each shifted one-eighth of a period with respect to one another, and their complements. Each of the output signals may be used to control a connection to at least one impedance, such that the switch (or switch network) may toggle between eight impedances each period.

The frequency synthesizer may be implemented, for example, using a variable oscillator. A voltage controlled oscillator 320 is shown in FIG. 3 to implement a variable oscillator although other variable oscillators may be used in other examples. Generally, the voltage controlled oscillator 320 is a device that outputs a clock (e.g., a square wave) with a frequency that is proportional to an input (e.g., an input voltage) to the voltage controlled oscillator 320. The frequency output of the variable oscillator may be varied by using the digital to analog converter 318 to generate the appropriate inputs to the variable oscillator (e.g., voltage controlled oscillator 320). For example, the frequency synthesizer may include a digital to analog converter, such as digital to analog converter 318. The digital to analog converter 318 may translate the digital frequency plan provided by baseband circuitry 302 into an analog control signal (e.g., a voltage signal) used to control the voltage controlled oscillator 320 to achieve the desired frequencies.

In some examples, the digital to analog converter 318 and voltage controlled oscillator 320 may be integrated into a single integrated circuit block using, e.g., a phase locked loop.

The switch mapper 322 may be used to provide a control signal to the switch 314 in accordance with the output signals provided by the frequency synthesizer. For example, the switch mapper 322 may output a three bit signal indicative of which of the available impedances 312 should be coupled to the antenna at any time. Note that it may be flexible as between the output signals from the modulator, the switch mapper, and the switch or switch network, as to where the output signals are decoded into control signals which select a desired impedance for the backscatter device. For example, eight discrete switches may be used to implement switch 314. Eight output signals may be provided (e.g., four square waves and their complements), each shifted one-eighth of a period from each other. The switch mapper may accordingly provide eight pulses—one at each eighth of a period—responsive to the eight input square waves. Each pulse may control one switch, such that the device may toggle between the eight impedances. In other examples, the switch mapper may provide a three-bit signal, as shown in FIG. 3, and the switch 314 may be implemented using an 8-pole switch which may decode the three-bit input into eight outputs, each of which may control a connection to an impedance.

Accordingly, in examples described herein, baseband circuitry 302 may output a number of bits equal to a spreading factor (SF) of the CSS scheme used. The SF bit signal from baseband circuitry 302 may be used to provide $2^{SF}$ possible outputs of the digital to analog converter 318. The analog voltage output of the digital to analog converter 318 may control the frequency of the voltage controlled oscillator 320. In this manner, $2^{SF}$ frequencies may be provided from the voltage controlled oscillator 320 during operation. In this manner, the digital to analog converter may have a bit resolution corresponding to a spreading factor used by the backscatter device.

In some examples, the frequency synthesizer may be implemented by a direct digital synthesizer. The direct digital synthesizer may directly, in the digital domain, generate output signals (e.g., a square wave having variable frequency) for controlling the switch 314. Any of a variety of direct digital synthesis techniques may be used to digitally generate the output signals from a frequency plan provided by the baseband circuitry 302.

In some examples, in addition to provide a backscatter signal including CSS signals (e.g., LoRa packets), backscatter devices described herein may implement coding in the backscatter signal (e.g., Hamming codes).

Examples described herein may utilize backscatter devices to synthesize CSS signals (e.g., provide one or more CSS signals and/or CSS symbols in a backscatter signal). Note that the complexity of generating CSS signals in the digital domain may scale exponentially with the spreading factor used in the CSS transmissions. To understand this, consider CSS modulation with a spreading factor of two. As described herein, a CSS signal with a spreading factor SF can have $2^{SF}$ cyclic shifts.

Figure 4:
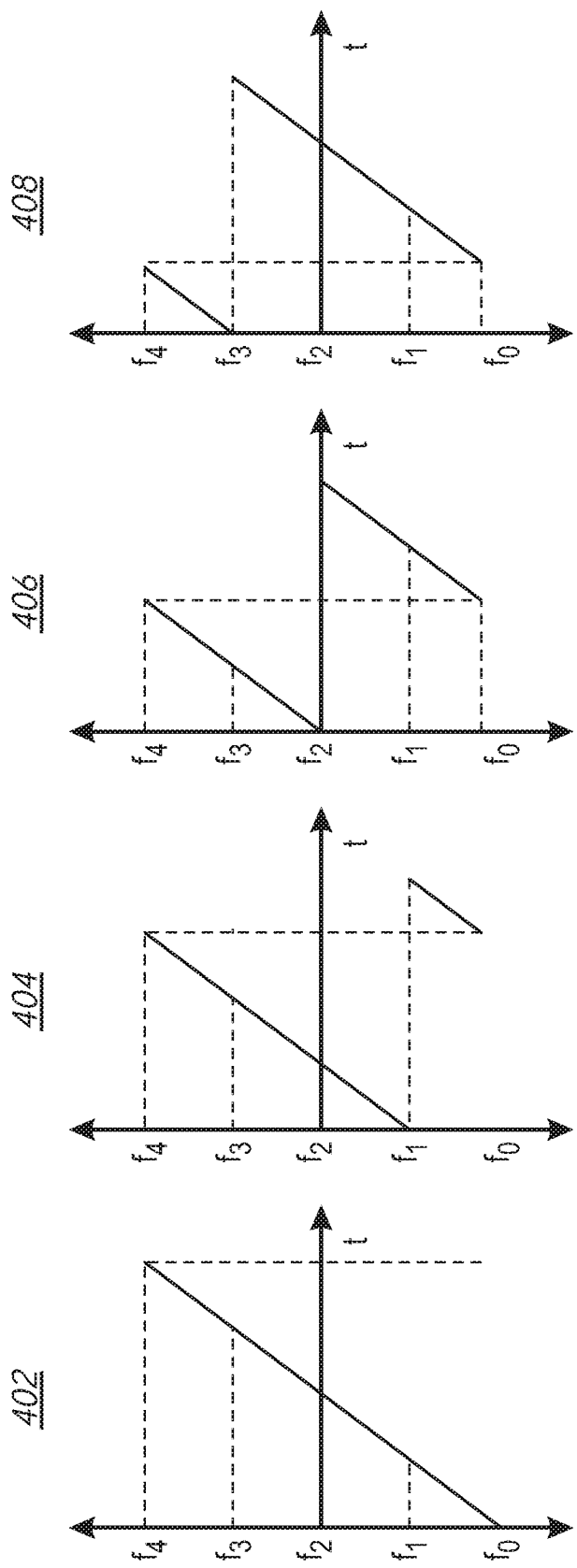
FIG. 4 illustrates chirp spread spectrum symbols in accordance with examples described herein.

FIG. 4 is a schematic illustration of four chirp spread spectrum symbols in accordance with examples described herein. FIG. 4 includes symbol 402, symbol 404, symbol 406, and symbol 408. Additional, fewer, or different symbols may be used in other examples. Each symbol shown in FIG. 4 is shown as a graph of frequency (y-axis) versus time (x-axis). Each symbol has a linearly increasing frequency with a different cyclic shift. Symbol 402 is a base symbol, with no shift. Symbol 404 is shifted ¼ of a symbol time. Symbol 406 is shifted ½ of a symbol time. Symbol 408 is shifted ¾ of a symbol time. In this manner, the four cyclic shifts shown in FIG. 4 correspond to CSS modulation with a spreading factor of two. Accordingly, to create these symbols, examples of backscatter devices described herein (e.g., backscatter device 300 of FIG. 3) may generate at least the four frequencies, f0, . . . , f3, shown in FIG. 4. Generally, to synthesize a CSS modulation with a spreading factor of SF, backscatter devices described herein may create signals at $2^{SF}$ frequencies. LoRa receivers may use spreading factors between 6 and 12. This translates to 64-4096 frequencies. Backscattering all these frequencies may utilize 64-4096 oscillators or may involve running the digital clock at a frequency of 1 cm(f0, f1, . . . , f4096). The first approach may be expensive and power consuming while the latter may undesirably use a clock frequency of GHz, which may be power consuming and undesirable as it may reduce the advantages of using backscatter.

Examples of backscatter devices described herein may take a different approach to generating CSS modulated signals. A hybrid digital-analog backscatter design may be used, as shown in FIG. 3, where the energy efficient digital domain (e.g., baseband circuitry 302) may be used to create a frequency plan for continuously varying CSS signals and then the frequency plan may be mapped to the analog domain using a DAC (e.g., digital to analog converter 318). For example, to create the second cyclic shift for symbol 406 in FIG. 4, the baseband circuitry 302 of FIG. 3 may create the frequency plan f1, f2 f3, f0, which the analog domain (e.g., digital to analog converter 318, voltage controlled oscillator 320) may utilize to create the desired frequencies.

Note, however, that, as shown in FIG. 2 and FIG. 4, in a CSS symbol, the frequency of the signal may vary from a negative frequency (−BW) to a positive frequency (BW). A voltage-controlled oscillator, however, such as voltage controlled oscillator 320, may only output signals at positive frequency. Accordingly, examples of backscatter devices described herein may synthesize negative frequencies by approximating sine and cosine signals using a square wave (e.g., one or more square waves output of a frequency synthesizer, such as a variable oscillator like voltage controlled oscillator 320 of FIG. 3 or a direct digital frequency synthesizer). Negative frequencies can be expressed as complex signals. For example, the complex exponent, $e^{j2\pi(\pm f)t}$ can be written as $\cos 2\pi ft \pm j\sin 2\pi ft$. Thus, negative frequencies may be generated using both an in-phase cosine signal as well as an out-of-phase sine signal at the desired frequencies. To do this, examples described herein approximate the sine and cosine signals using one or more square waves (e.g., output by the voltage controlled oscillator 320). This process may create out-of-band harmonics. Examples described herein may reduce and/or eliminate certain harmonics utilize switching between multiple impedance states.

Examples of backscatter devices described herein may use square waves to approximate sine and cosine waves in the generation of output signals (e.g., output of voltage controlled oscillator 320 of FIG. 3). The use of square waves to approximate sine and cosine waves may result in harmonic components present in the backscattered signal, which may not be desirable in some instances. Examples of the use of square waves to approximate sine and cosine waves in the generation of backscattered signals is described, for example, in co-pending PCT International application number PCT/US2017/015170, tiled Jan. 26, 2017 entitled "Backscatter devices including examples of single sideband operation," and US Provisional application Ser. No. 62/287,322, filed Jan. 26, 2016, and U.S. Provisional application Ser. No. 62/292,088, filed Feb. 5, 2016, the entire contents of all three applications which are hereby incorporated by reference in their entirety for any purpose.

To understand why harmonic components occur when square waves are used as sine and cosine wave approximations, recall that a square wave at a rate of Δf can be written as a sum of cosine waves as follows:

$$\text{Square}(\Delta f t) = \frac{4}{\pi} \sum_{n=0}^{\infty} \frac{1}{2n+1} \cos(2\pi(2\pi+1)\Delta f t) \quad \text{Equation 1}$$

If an RF source (e.g., helper device 104) transmits cos (2πf$_c$t) and a backscatter device is switching with a square wave operating at Δf frequency (e.g., an output of a variable oscillator controlling a backscatter device's switch, e.g., voltage controlled oscillator 320 is at Δf, the backscatter signal provided by the backscatter device can be written as cos(2πf$_c$t)Square (Δf). As a result, in addition to generating the desired signal at f$_c$+Δf , the above operation also generates the mirror copy at f$_c$−Δf, a weaker (e.g., 9.5 dB lower) harmonic at f$_c$±3Δf , another weaker (e.g., 15 dB lower) harmonic at f$_c$±5Δf and additional lower power harmonics, The mirror copy generated at f$_c$−Δf may be reduced and/or eliminated using single side band backscatter techniques, described for example in co-pending PCT International application number PCT/US2017/015170, filed Jan. 26, 2017 entitled "Backscatter devices including examples of single sideband operation," and US Provisional application Ser. No. 62/287,322, filed Jan. 26, 2016, and U.S. Provisional application Ser. No. 62/292,088, filed Feb. 5, 2016, the entire contents of all three applications which are hereby incorporated by reference in their entirety for any purpose. Backscattering into a single sideband generally involves switching between four impedance values at the backscatter switch. However, the third, fifth and other odd order harmonics may still be present in the signal. The third and fifth order harmonics may only be 9.5 and 15 dB lower than the desired backscattered signal and hence may create undesirable interference on the wireless channel. Also, since CSS signals, such as the LoRa protocol, may have very low sensitivities, CSS communicating devices (e.g., LoRa devices) operating in channels overlapping with the third and fifth harmonics may experience in-band interference from backscatter devices.

Examples described herein may effectively be considered to utilize a different signal from the square wave to approximate cosine and sine wave. Ultimately, by switching between eight impedances (rather than two, for example), the third and fifth order harmonic components may be reduced and/or eliminated from the backscatter signal. In order to understand how this occurs, some description regarding multi-level signals is provided. it is to be understood that the description with reference to FIG. 5 includes description of square wave and multi-level signals which may not physically be generated on a backscatter device. Rather, the multi-level signal may be generated as a result of switching between a plurality of impedances (e.g., eight impedances) as described herein. For example, one can think of an analog signal as a discrete signal with infinite distinct voltage levels and smooth transitions, which results in a clean spectrum without any harmonics. However, a square wave has only two levels with discontinuous step transitions, which results in high frequency components. Examples described herein may effectively be considered to utilize a multi-level square wave signal to introduce additional voltage levels which may better approximate a sinusoidal signal.

Figure 5:
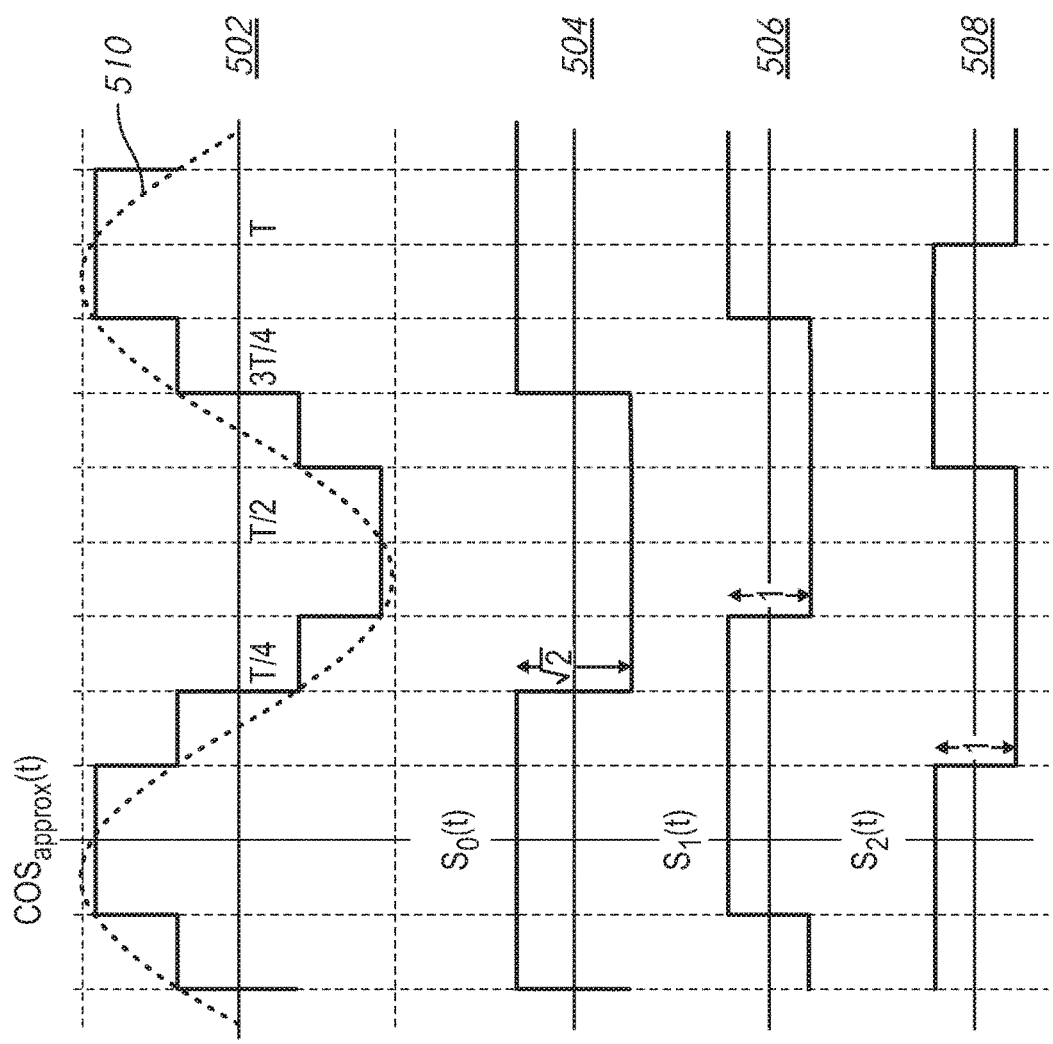
FIG. 5 is a timing diagram of a multi-level signal approximating a cosine using a sum of three digital signals arranged in accordance with examples described herein.

FIG. 5 is a timing diagram of a multi-level signal approximating a cosine using a sum of three digital signals arranged in accordance with examples described herein. FIG. 5 illustrates multi-level signal 502, square wave 504, square wave 506, and square wave 508. Additional, fewer, and/or different signals may he used in other examples. The multi-level signal 502 is \ a sum of square wave 504, square wave 506, and square wave 508, and may better approximate cosine wave 510 than a simple square wave. By summing three square waves, the multi-level signal 502 includes four voltage levels. Each signal of FIG. 5 is shown as a graph of voltage over time. Other electrical parameters may be varied in other examples, such as current. The approximated cosine wave, multi-level signal 502, can be written as the sum of three square waves slightly shifted from one other, S0 (t) (square wave 504), S1 (t) (square wave 506) and S2 (t) (square wave 508), as shown in FIG. 5, T of FIG. 5 refers to a time period. The three signals can be written as:

$$S_0(t) = \frac{4\sqrt{2}}{\pi} \sum_{n=0}^{\infty} \frac{\sin\left[(2n+1)2\pi\Delta f\left(t+\frac{T}{4}\right)\right]}{2n+1} \quad \text{Equations 2-4}$$

$$S_1(t) = \frac{4}{\pi} \sum_{n=0}^{\infty} \frac{\sin\left[(2n+1)2\pi\Delta f\left(t+\frac{T}{8}\right)\right]}{2n+1}$$

$$S_2(t) = \frac{4}{\pi} \sum_{n=0}^{\infty} \frac{\sin\left[(2n+1)2\pi\Delta f\left(t+\frac{3T}{8}\right)\right]}{2n+1}$$

Note that S$_0$ has an amplitude of sqrt(2) (giving two voltage levels in the multi-level signal 502, +sqrt(2) and −sqrt(2)), while S$_1$ and S$_2$ have an amplitude of 1 (giving two additional voltage levels in the multi-level signal 502, +1, and −1). Using the above expressions for the three signals, the approximated cosine waveform (a sum of the three signals) may be written as:

$$\cos_{approx}(2\pi\Delta f t) = S_0(t) + S_1(t) + S_2(t) = \quad \text{Equation 5}$$

$$\frac{4}{\pi} \sum_{n=0}^{\infty} \frac{\sin\left[(2n+1)2\pi\Delta f\left(t+\frac{T}{4}\right)\right]\left[2\cos\left((2n+1)\frac{\pi}{4}\right)+\sqrt{2}\right]}{2n+1}$$

where the cosine approximation is a sum of three differently-shifted digital square wave signals. While the example of three digital square wave signals to approximate a cosine waveform is used here, in other examples, a different number of digital square wave signals may be summed to result in a multi-level signal approximating a cosine wave—including 1, 2, 3, 4, 5, 6, 7, 8, 9, 10, or more digital square wave signals.

The sine wave may be generated by simply shifting the cosine waveform by quarter of the time period. Using these approximations for the sine and cosine parts of the waveform, the exponential, $e^{j2\pi\Delta ft}$, can now be mathematically written as, $$e^{j2\pi\Delta ft} = \quad \text{Equation 6}$$

-continued
$$\cos(2\pi\Delta ft) + j\sin(2\pi\Delta ft) \approx \cos_{approx}(t) + j\sin_{approx}(t) =$$

$$\frac{2}{\pi}\sum_{n=0}^{\infty}\frac{1}{2n+1}\left[2\cos\left((2n+1)\frac{\pi}{4}\right) + \sqrt{2}\right]$$

$$[e^{j(2n+1)2\pi\Delta ft}((-1)^n + 1) + e^{-j(2n+1)2\pi\Delta ft}((-1)^n - 1)]$$

Consider what happens with Equation 6 for different values of n. When n is zero, the term corresponding to the negative frequency in the second parenthesis computes to zero and only the positive frequency is preserved resulting in a backscatter signal having a single side band n=1 and 2 correspond to the third and fifth harmonic components, respectively. For these cases cos [(2n+1)π/4]=−sqrt(2)/2 and so the above equation computes to zero cancelling the third and fifth harmonics. Thus, by using the four level multi-level signal 502, the third and fifth harmonic components may be cancelled and/or reduced, and single sideband modulation may be achieved at the same time. More generally, when n is of the form (8k+3) and (8k+5), then cos [(2n+1)π/4]=−sqrt(2)/2, and hence all the corresponding harmonics may be cancelled and/or reduced. Accordingly, the four-level multi-level signal 502 may cancel and/or reduce at least the third and fifth order harmonic components.

If desired, in some examples, additional harmonic components may be reduced and/or cancelled by generating a multi-level signal with more than four levels. For example, an addition of each level may cancels the next higher order harmonic. For example, five voltage levels in a multi-level signal may be used to cancel and/or reduce the seventh harmonic component and the ninth harmonic component may be cancelled and/or reduced using a multi-level signal having six voltage levels.

Note that a backscatter switch, such as switch 314, may have a finite delay, which may provide additional filtering in some examples, and may automatically suppress higher order harmonics (e.g., greater than the ninth order harmonic component) without a need for additional levels in the multi-level signal in some examples.

Accordingly, examples described herein may effectively utilize a multi-level signal having four levels to cancel and/or reduce the third and fifth order harmonic components in a backscatter signal. The approximated signals may be generated on the backscatter device, such as in backscatter device 300, in the digital domain (e.g., by baseband circuitry 302). The four level cosine signal may take one of four values {0.9239, 0.3827, −0.3827, −0.9239}. Fixing the cosine value lets the sine take one of two values. Thus, the exponential $e^{j2\pi\Delta ft}$ can take one of eight complex values. These complex values may be created by leveraging backscatter techniques that change the impedance connected to the antenna. Accordingly, the antenna of backscatter device 300 may be switched between eight different complex impedance values to generate the eight complex values corresponding to the desired exponential signal.

Accordingly, backscatter devices described herein, such as backscatter device 300 may include a frequency synthesizer which may provide multiple shifted versions of a clock signal (e.g., each shifted by one-eighth of a clock period), and their complements, for use in backscatter techniques which may provide harmonic cancellation. Moreover, switching between multiple (e.g., eight) complex impedance values may allow the generation of eight complex values corresponding to a desired exponential signal, removing and/or reducing the presence of a third and/or fifth harmonic component in the backscatter signal.

The eight complex impedance values which may be used may be expressed in polar notation as:

$$\frac{\sqrt{2}}{2}, j\frac{2+\sqrt{2}}{2}$$

$$\frac{2+\sqrt{2}}{2}, j\frac{\sqrt{2}}{2}$$

$$\frac{2+\sqrt{2}}{2}, -j\frac{\sqrt{2}}{2}$$

$$\frac{\sqrt{2}}{2}, -j\frac{2+\sqrt{2}}{2}$$

$$-\frac{\sqrt{2}}{2}, -j\frac{2+\sqrt{2}}{2}$$

$$-\left(\frac{2+\sqrt{2}}{2}\right), -j\frac{\sqrt{2}}{2}$$

$$-\left(\frac{2+\sqrt{2}}{2}\right), j\frac{\sqrt{2}}{2}$$

$$-\frac{\sqrt{2}}{2}, j\frac{2+\sqrt{2}}{2}$$

Utilizing a Smith chart, the complex impedance values translate into particular nominal component values for capacitances, resistances, and inductances.

For example, when inductors and capacitors are available, the following nominal component values may be used to implement the above impedances:

Eight impedance values=open, 21 pF, 8.7 pF, 3.6 pF, short, 3.6 nH, 8.7 nH, 21 nH.

In some examples, inductors may be undesirably large to implement in a backscatter device, accordingly, in some examples, the impedance values may be generated using resistors and capacitors. in such examples, Eight impedance values=50 Ω & series 17.4 pF capacitor, 6.38 Ω & series 12.95 pF capacitor, 8.69 pF. 2.85 Ω & series 5.79 pF capacitor, 10 Ω & series 3.47 pF capacitor, 23 Ω & series 1.37 pF capacitor, 50 Ω, 97.14 Ω & series 5.8 pF capacitor In practice, the backscatter device may present a variety of parasitics and losses, accordingly, the above nominal values may be adjusted in any particular implementation to take mismatches and losses into consideration. These impedance values may be used to implement, for example impedances 312 of FIG. 3.

Referring back to FIG. 3, the switch mapper 322 may be used to control the switching among the eight impedances. The switch mapper 322 may be implemented using, for example, digital logic circuitry. The switch mapper 322 may receive as input the eight phases of the VCO output (e.g., at each eighth of a period). The eight phases of the clock signal may be generated by shifting the signal in one-eighth of the time period increments and providing the shifted signal to the switch mapper 322. The switch mapper 322 may then output a three hit control signal. Over time, changes in this three bit control signal toggle the switch between the available eight impedance values, which may cause generation of the approximate exponential wave in the backscatter signal. Using this technique examples described herein may successfully cancel and/or reduce a mirror image present in the backscatter signal as well as the third and fifth harmonic components, which may improve the spectral efficiency of backscatter systems.

Figure 6:
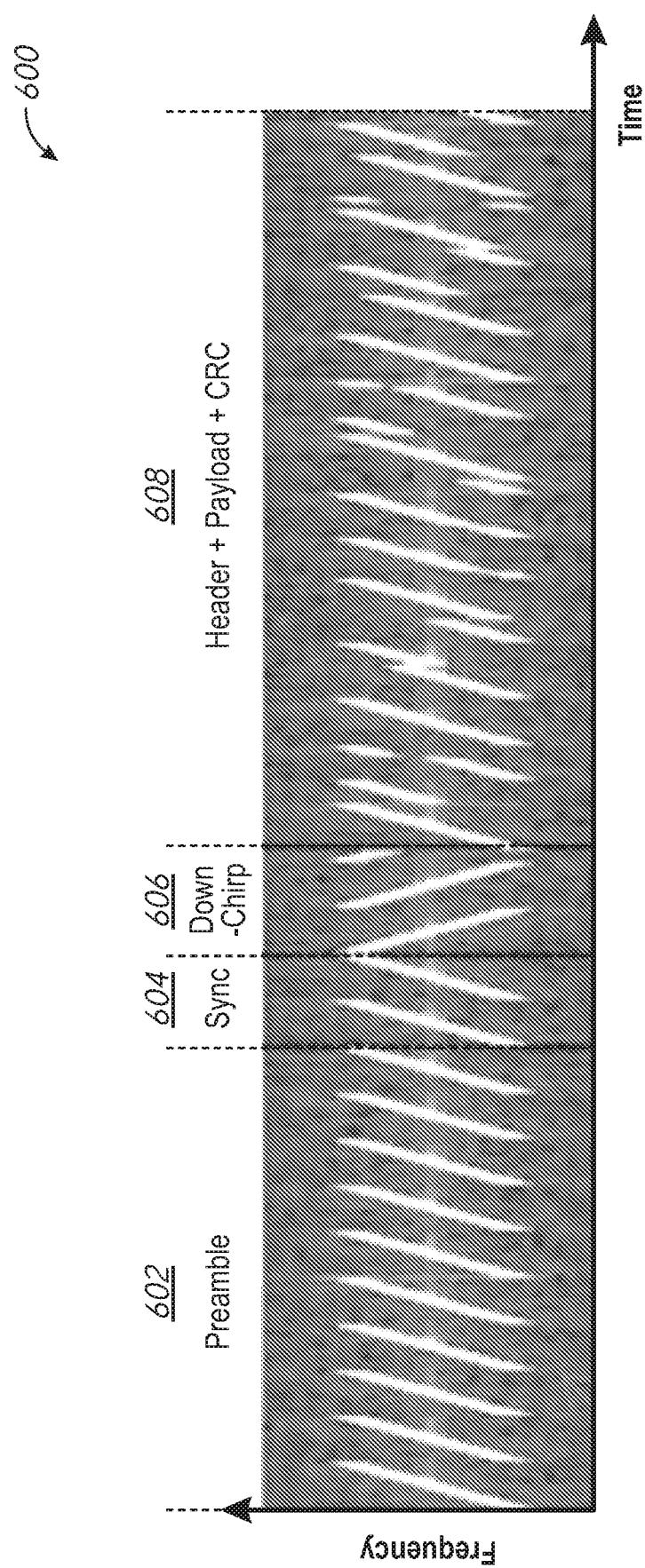
FIG. 6 is a spectrogram of a packet arranged in accordance with a LoRa protocol in accordance with examples described herein.

Examples described herein may provide backscatter signal which utilize CSS modulation. Packets in the backscatter signals may be arranged in accordance with a LoRa protocol. FIG. 6 is a spectrogram of a packet arranged in accordance with a LoRa protocol in accordance with examples described herein. Generally, LoRa may be able to achieve high sensitivity using CSS modulation. The LoRa packet 600 includes preamble 602, sync 604, downchirp 606, and payload 608. The payload 608 may also include a header and error checking bits (e.g., CRC bits). As shown in FIG. 6, the LoRa packet 600 may include a sequence of repeating chirps at the beginning to represent the preamble 602. LoRa. supports a variable length preamble between 6 and 65535 chirp symbols. To convey the end of the preamble to the receiver, the preamble ends with synchronization symbols, sync 604 and two and a quarter down-chirp symbols, downchirp 606, where the chirp goes from the positive to negative frequency. After down-chirps, the packet has an optional header with information about the bit rate used. This is followed by a CSS-encoded payload, payload 608. An optional 16-bit CRC may be sent at the end of the packet.

The header described with reference to payload 608 is optional and in some examples may be reduced and/or eliminated by statistically configuring parameters such as LoRa bandwidth and/or spreading factor.

LoRa bit rates generally depend on the error correction coding rate, chirp bandwidth and spreading factor. LoRa supports four different hamming code rates and eight chirp bandwidths of 7.8 kHz, 10.4 kHz, 20.8 kHz, 31.25 kHz, 62.5 kHz, 125 kHz, 250 kHz and 500 kHz. Further, the spreading factor may be set independently to one of seven values: 6, 7, 8, 9, 10, 11 and 12. The LoRa hardware may allow these three parameters to be independently modified resulting in a total of 224 bit rate settings between 11 bps and 37.5 kbps.

Examples described herein may utilize the packet format shown in FIG. 6 to synthesize .LoRa packets with backscatter. For example, the baseband circuitry 302 of FIG. 3 may provide frequency plans to construct preamble 602, sync 604, downchirp 606, and payload 608. The data may be CSS modulated by modulator 304 and provided in a backscatter signal using switch 314 to backscatter an incident carrier signal.

LoRa bandwidth and spreading factor may be set a-priori and may be known at the transmitter and receiver of systems described herein (e.g., at backscatter device 108, backscatter device 110, and receiver 106 of FIG. 1). The selected bandwidth and spreading factor may, for example, be stored in memory included in or otherwise accessible to backscatter devices and receivers described herein.

In some examples, CSS signals and/or symbols arranged in accordance with a

LoRa, protocol may include chirps whose phase changes continuously with time and has the same value at the beginning and the end of the chirp. Accordingly, backscatter devices described herein may, at each frequency, utilize an integer multiple of the wavelength to facilitate having a phase at the beginning and end of each symbol being the same and phase continuity may be maintained across symbols.

LoRa protocols may utilize frequency hopping and lower-data rate transmissions. For example, while using a chirp bandwidth of 125 kHz, a LoRa protocol may divide the 900 MHz ISM band into 64 channels starting at 902.3 MHz with increments of 200 kHz. While using a chirp bandwidth of 500 kHz, a LoRa protocol may divide the band into 8 channels in increments of 1.6 MHz. A transmitter may perform frequency hopping between these channels to transmit data, which may aid in regulatory compliance.

Examples of RF signal sources described herein (e.g., helper device 104 of FIG. 1) may provide a frequency hopped carrier signal. Regardless of the frequency hopping by the carrier signal, backscatter devices described herein may utilize a same offset $\Delta f$. For example, the helper device 104 of FIG. 1 may provide a carrier signal which is hopped at a constant frequency offset of $\Delta f$ from LoRa channel frequencies. In this manner, backscatter devices (e.g., backscatter device 108 and/or backscatter device 110) may shift the frequency by $\Delta f$ to provide backscatter signals in the LoRa channel frequencies. For example, to generate backscatter signals at LoRa channels $f_1, f_2, f_3, \ldots f_n$, the helper device 104 may provide a carrier signal which is hopped across $f_1-\Delta f, f_2-\Delta f, f_3-\Delta f\ f_n-\Delta f$.

In some examples, RF sources described herein (e.g., helper device 104) may arbitrate the channel between backscatter devices (e.g., backscatter device 108 and/or backscatter device 110). Systems described herein may support concurrent transmissions from multiple backscatter devices.

Examples described herein may utilize TDMA, to allocate the wireless channel between different backscatter devices. Since the backscatter devices are designed to be low-power and low-cost, the scheduling may in some examples be performed by the RF source (e.g., helper device 104) and/or the receiver (e.g., receiver 106). At the beginning of each time slot, the receiver may perform carrier sense. If the channel is available, the receiver may transmit a unique ON-OFF keying sync pattern to the desired backscatter device (e.g., backscatter device 108 or backscatter device 110). The RF source detects the sync pattern and follows it with the transmission of the carrier signal (e.g., single tone signal).

Backscatter devices described herein may detect the sync pattern at the beginning of the carrier signal incident from the RF source. Accordingly, backscatter devices may include a receiver to detect the sync pattern. The backscatter device receiver may advantageously be low power.

Figure 7:
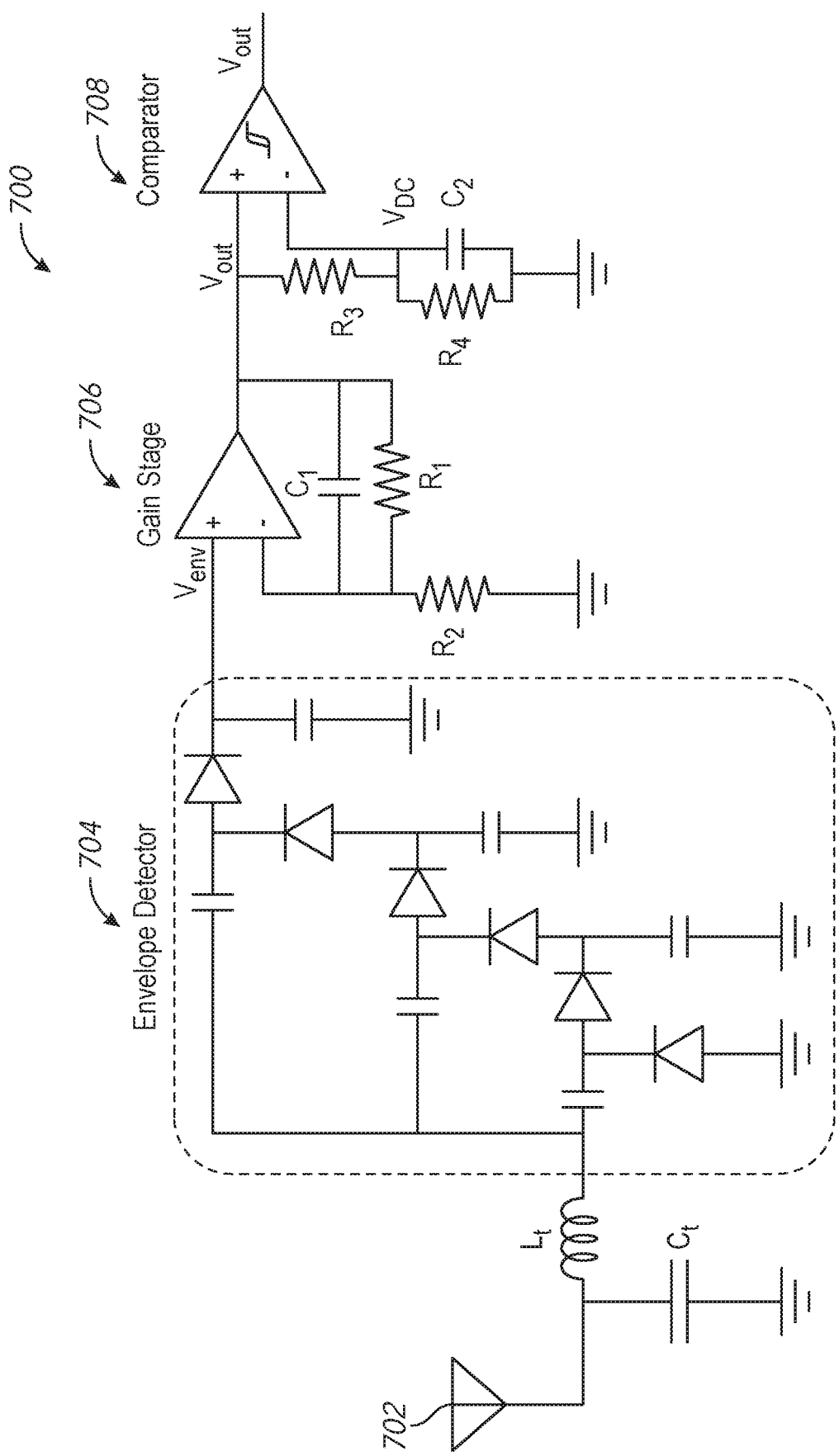
FIG. 7 is a schematic illustration of a backscatter device receiver arranged in accordance with examples described herein.

FIG. 7 is a schematic illustration of a backscatter device receiver arranged in accordance with examples described herein. The receiver 700 is coupled to antenna 702 and includes envelope detector 704, gain stage 706, and comparator 708. Additional, fewer, and/or other components may be used in other examples. The receiver 700 may be included in any backscatter devices described herein (e.g., backscatter device 108, backscatter device 110, and/or backscatter device 300). For example, the receiver 700 may be used to implement and/or may be implemented by envelope detector 316 of FIG. 3. The antenna 702 may be used to implement and/or may be implemented by, for example, the antenna coupled to backscatter device 300.

In some examples, the receiver 700 may detect signals as low as −48 dBm. Some examples of backscatter devices may use envelope detector based passive receivers which may consume as low as few microwatts. However, such envelope detector based passive receivers may only detect signals down to only −30 dBm in some examples, which may translate to a range of 65 m. This may be inadequate for systems described herein, where backscatter devices may be further away from the RF source—e.g., over 100 m away in some examples, over 200 m away in some examples, over 300 m away in some examples.

Some receiver designs may fail to decode below −30 dBm in part because of limitations of the comparator. Comparators may utilize a minimum voltage threshold, e.g., difference between high and low voltage levels to accurately detect a transition. As the input power decreases, the output of the envelope detector also decreases and when the different between the high and the voltage drops below the voltage threshold/hysteresis of the comparator (typically 1-4 mV), the receiver may fail to correctly decode the ON-OFF keying message.

The architecture of receiver 700 may have improved ability to receive weak signals. The gain stage 706 is built using an operational amplifier to boost the output voltage of the envelope detector 704, Venv, The operational amplifier (Op-Amp) may provide at least 10× gain at data rates of 1-10 kbps while consuming only 1.5 µW of power. Resistor R1 is coupled between the output and the negative input of the Op-Amp, resistor R2 is coupled between the negative input of the Op-Amp and ground. Resistors $R_1$ and $R_2$ are used to set the gain of the gain stage 706. The output of the Op-Amp is then filtered using passive components (e.g., resistors and capacitor R3, R4 and C2) to generate the DC voltage VDC. The comparator 708 compares the Op-Amp output Vout with VDC to detect bits encoded using ON-OFF keying.

Using this design, the receiver 700 may reliably detect signals down to −48 dBm for 1 kbps and −46 dBm for 10 kbps while consuming only 2 µW of power. This translates to a range of 650 m and 410 m from the RF source. In some examples, accuracy of detecting the signal (e.g., in presence of interference) may be improved by using coding on top of ON-OFF keying signal. For example, a carrier signal may include a preamble signal and utilize codes (e.g, Barker/ Gold codes) which have high auto-correlational properties. This may reduce the probability of confusing random transmissions in the 900 MHz band for the carrier signal.

Examples of backscatter devices described herein do not need to have their receivers ON all the time. Depending on the application, the backscatter device may only transmit periodically (e.g., when it has new data). Similarly, the RF source may not transmit the carrier signal during particular time slots, for example, if the corresponding backscatter device is not scheduled for a transmission.

In some examples systems, only a single backscatter device may transmit at a time. However, in other examples, backscatter devices may have concurrent transmissions. For example, a LoRa protocol may divide the 900 MHz band into 64 125 kHz LoRa channels each of which can have a LoRa transmission. Thus, using a single RF source (e.g., helper device 104), a system may include up to 64 backscatter devices which may transmit concurrently on different LoRa channels. Any number of receivers may be used. Generally, CSS transmissions that use different spreading factors on the same LoRa channel may be uncorrelated with each other. Thus, in some examples, multiple backscatter devices with different spreading factors may provide backscatter signals on the same channel (e.g., LoRa band) and transmit concurrently to their receivers, which may increase the overall network throughput.

In some examples, different backscatter devices in a system may each use a different Δf (e.g., offset frequency) to backscatter a carrier signal into a different frequency channel per device. The offset frequency, Δf, to be used by each backscatter device may be communicated in some examples from a carrier source (e.g., helper device 104) to each backscatter device (e.g., backscatter device 108 and/or 110).

An energy detector circuit on backscatter devices described herein may be used to transmit the desired Δf, ACKs, or other information on a downlink channel. However, given the resilience of CSS modulation and the high sensitivity values, performing application level error correction codes may be sufficient to deliver data to the receivers, with a high probability, without the need for explicit ACKs provided by the backscatter devices.

Example systems described herein may integrate a carrier source generator (e.g., helper device 104) and a backscatter signal receiver (e.g., receiver 106) into a same hybrid device. Doing so may encounter challenges. For example, in the case of a system generating backscatter signals arranged in accordance with a LoRa protocol, a signal source (e.g., helper device 104) may transmit a single tone signal at a frequency fc and a backscatter device (e.g., backscatter device 108 and/or backscatter device 110) may use this carrier signal to synthesize a Lora packet at frequency fc+Δf. A receiver (e.g., receiver 106) may be configured to operate at fc+Δf and may receive and decode the Lora packet in the backscatter signal. However, in addition to the Lora packet, the receiver may also receive an out of band single tone signal centered at fc (e.g., the carrier signal). The received Lora packet in the backscatter signal may be as low as −148 dBm in power, and the out of band signal tone interference may be much stronger. For example, when the signal source and transmitter are co-located, the single tone signal at the receiver may be as high the transmit power of 30 dBm.

Hybrid receivers described herein may leverage the fact that receivers using CSS modulation may be designed to work (e.g., receive accurately) in the presence of strong out of band interference and the amount of interference the receiver can handle increases as the frequency offset is increased. For example, the Sx1276 chipset can decode Lora packets in the presence of a single tone blocker/interference which is up to 89 dB higher in power at 1 MHz offset, 94 dB higher in power at 2 MHz offset and 100 dB higher in power at 10 MHz offset. Examples described herein may utilize an appropriate frequency offset at the backscatter device and use self-interference cancellation techniques to help ensure that signal strength of the single tone is below the out of band blocker specifications of the receiver.

Figure 8:
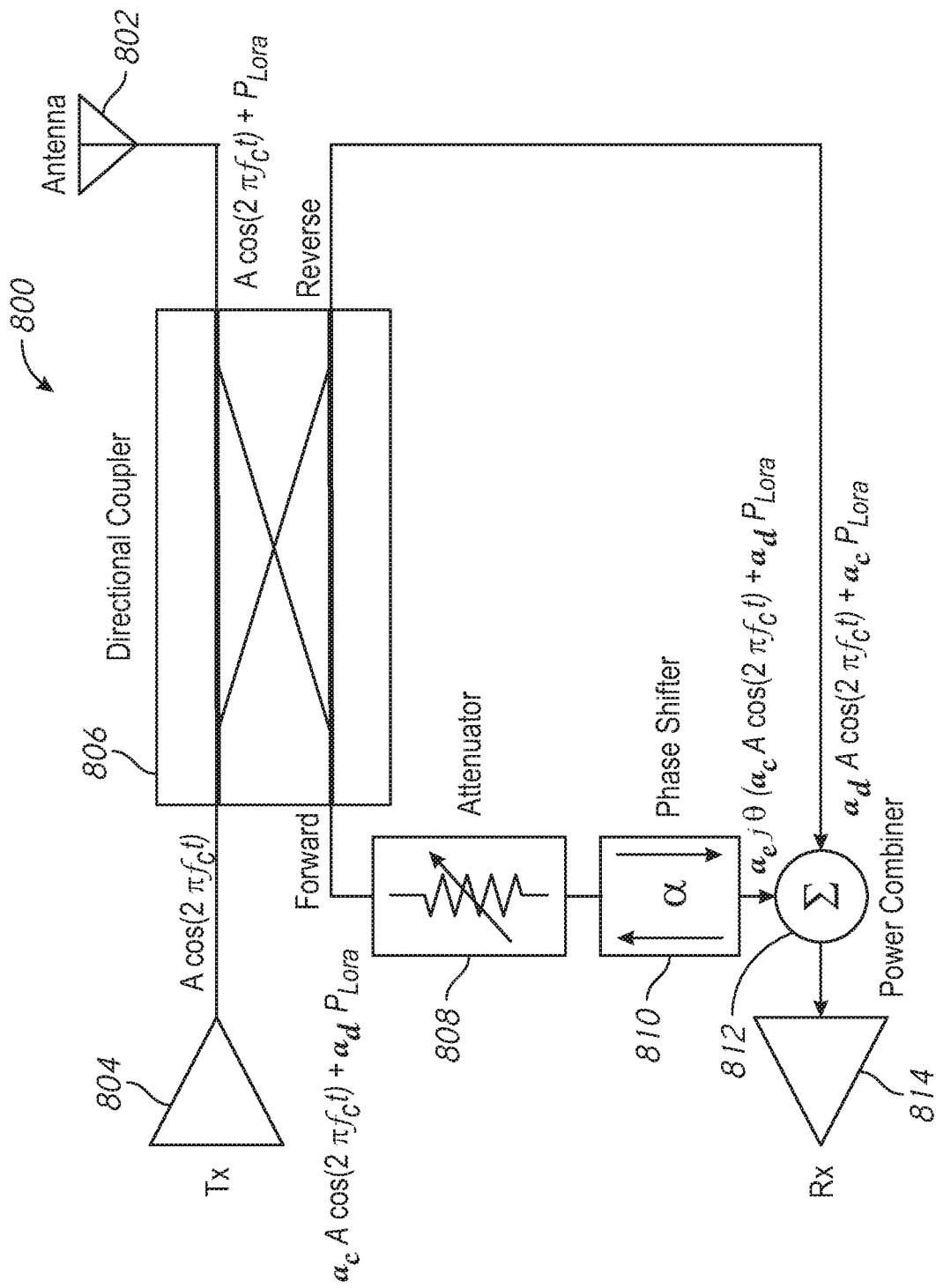
FIG. 8 is a schematic illustration of a hybrid receiver arranged in accordance with examples described herein.

FIG. 8 is a schematic illustration of a hybrid receiver arranged in accordance with examples described herein. Hybrid receiver 800 includes antenna 802, transmitter 804, directional coupler 806, attenuator 808, phase shifter 810, combiner 812, and receiver 814. Additional, fewer, and/or different components may be used in other examples. The directional coupler 806 is coupled between the transmitter 804 and the antenna 802. A forward side of directional coupler 806 is coupled to receiver 814 through attenuator 808, phase shifter 810, and combiner 812. A reverse side of directional coupler 806 is coupled to combiner 812 such that the signal from the reverse side is combined with the signal from the forward side after the forward side signal has been through attenuator 808 and phase shifter 810. The combined signal from the combiner 812 is provided to receiver 814.

The transmitter 804 may output a single tone signal at 30 dBm output power (e.g., a carrier signal). The output of the transmitter connects to a port of directional coupler 806 (e.g. a 6 dB directional coupler). Another port of directional coupler 806 may be connected to antenna 802. The forward port of the directional coupler 806 outputs the single tone signal with a loss (e.g., a 6 dB loss, $\alpha_c$, coupling coefficient of the directional coupler) and the received backscatter signal (e.g., Lora packet) from the antenna 802 with a another loss (e.g., 30 dB loss ($\alpha_d$, directivity coefficient of the directional coupler). Similarly, the reverse port of the directional coupler 806 couples the received backscatter signal (e.g., Lora packet) from the antenna with a loss (e.g., 6 dB loss, $\alpha_c$) and the single tone from the antenna 802 with another loss (e.g., 30 dB loss, $\alpha_d$). The attenuator 808 may be a variable attenuator ($\alpha$) and the phase shifter 810 (ej θ)

are provided in the path of the signal from the forward side of the directional coupler 806. The attenuated, phase-shifted signal from the phase shifter 810 is combined (e.g., added) to the signal from the reverse port of the directional coupler 806 using a power combiner. e.g. combiner 812. The attenuation and phase shifter may be selected such that:

$$\alpha e^{j\Theta}(\alpha_c A \cos(2\pi f_c t)) + \alpha_c A \cos(2\pi f_c t) < -48 \text{ dBm} \quad \text{Equation 7}$$

This may aid in ensuring that the single tone interference at the receiver is less than the out of band blocker specification of the receiver. Note that this does not impact the backscatter signal (e.g., Lora packet). The signal strength of the backscatter signal (e.g., Lora packet) in the forward path is lower (e.g., 30 dB lower) which is further attenuated and phase shifted to combine with a much stronger backscattered signal (e.g., Lora packet). In the example of FIG. 8, a 6 dB directional coupler may be used, which means the backscatter signal (e.g., Lora packet) at the receiver 814 is 6 dB lower than the packet received at the antenna 802. However, the 6 dB directional coupler eliminates and/or reduces the need for expensive and bulky circulator and hence may be a desirable tradeoff.

Examples of backscatter techniques, devices, and systems described herein may facilitate communication in an array of applications, including home/office sensing, precision agriculture, and medical devices (e.g., implantable and epidermal devices)

In home and office sensing applications, examples described herein may offer coverage desirable for a practical home or office deployment. For example, a system such as shown in FIG. 1 may be deployed in a home or office building. The RF source (e.g., helper device 104) may be positioned at one location in the house (e.g., third floor) while the receiver (e.g., receiver 106) may be positioned at another location (e.g., basement). Backscatter devices (e.g., backscatter device 108 and/or backscatter device 110) may be positioned throughout the home or office. In a home or office environment, the any of these devices may be separated by insulated rooms and/or surfaces (e.g., restrooms, concrete and/or metal structures, etc.). Nonetheless, examples of backscattering using CSS modulation techniques described herein may provide adequate communication capability to allow backscatter devices distributed throughout a home or office to communicate with a receiver.

Precision agriculture applications may benefit from backscatter techniques, devices, and systems described herein. For example, an RF source (e.g., helper device 104) and a receiver (e.g., receiver 106) may be positioned at different locations around a farm (e.g., opposite ends of a farm). Backscatter devices (e.g., backscatter device 108 and/or backscatter device 110) may be positioned throughout the farm (e.g., to collect environmental data, such as but not limited to, temperature, humidity, soil parameters, incident light, etc.). Reliable across-farm communication by backscatter devices may be achieved using systems and techniques described herein.

Utilizing CSS modulation for backscatter as described herein may advantageously provide high sensitivity, which may enable long-range operation. This sensitivity also may enable longer ranges in extremely challenging RF environments such as implantable and body worn devices.

For example, a smart contact lens may measure indicators such as glucose, sodium and cholesterol in tears and enable long term unobtrusive real-time tracking of such vital parameters. A smart contact lens may be provided with a backscatter device described herein (e.g., backscatter device 300 of FIG. 3). In this manner, the smart contact lens may communicate using CSS modulated backscatter at orders of magnitude larger distances than may be feasible with prior approaches.

Flexible patch sensors can be used to monitor biological parameters such as temperature, sweat, ECG, and/or other vital signs in real time. These sensors may be worn on the body and may be in unfavorable RF environments since the antenna gets significantly detuned and degrades the link quality. Examples of backscatter devices described herein, such as backscatter device 300 of FIG. 3, may be included on a flexible patch sensor and may facilitate backscatter communication from patch sensors.

IMPLEMENTATION EXAMPLE

A proof of concept prototype of the backscatter design of backscatter device 300 of FIG. 3 was built using commercial off-the-shelf (COTS) components and used to characterize an operating range of an example system. An integrated circuit was designed based on the hybrid analog-digital architecture for harmonic cancellation described herein to quantify its power consumption.

The COTS implementation included an RF and a baseband section. The RF section was implemented on a four layer FR4 substrate included three cascaded ADG904 switches to create a SP8T switch network. The switch toggles a 2 dBi whip antenna across the eight impedance states used for the harmonic cancellation technique. In this implementation, 47 pF, 3.3 nH∥82 Ω,21 nH∥680 Ω, 8.2 nH∥330 Ω, 1.8 k Ω, 1.5 pF∥56 k Ω, 9.1 pF∥560 Ω and 3.9 pF were used as impedance values to achieve the desired complex values while incurring a loss of only 4 dB in the backscatter switch network.

The baseband section was implemented using the DE0-CV development board for an Altera Cyclone V FPGA. CSS modulated packets were generated in the digital domain using Verilog HDL and output square waves corresponding to the real and imaginary components of the signal provided to the RF section by interfacing the three digital I/Os on the FPGA to the SP8T switch network through level shifters.

LoRa backscatter was designed in a 65 nm LP CMOS process. The IC included three main components: digital baseband processor, frequency synthesizer and the backscatter switch network.

The baseband processor takes payload data and packet specifications such as spreading factor, bandwidth and code rate as input and synthesizes a LoRa packet in accordance to the structure described herein. Next, it maps the bits in the packet to a frequency plan that is used by the frequency synthesizer block to create the chirp spread spectrum signal. The behavioral model for the LoRa packet was described in Verilog and Design Compiler by Synopsis was used to synthesize the transistor level implementation. The baseband processor consumed 1.25 µW to generate a LoRa packet with spreading factor of 12, 31.25 kHz bandwidth and (4,8) hamming code.

The DAC and VCO shown in FIG. 3 were integrated into a single frequency synthesizer block in this implementation. A frequency synthesizer or phase locked loop (PLL) takes a low frequency clock source as input and up converts it to a higher frequency. The ratio of the output frequency to the reference frequency is set by a divide ratio. The baseband processor output was used to directly control the divide ratio of the frequency synthesizer and modulate the output frequency to generate CSS modulated data. A Johnson counter was used to generate the four versions of the clock which are shifted by one eighth of the time period. The four shifted versions and their complements are used to represent the eight phases of the clock signal. The frequency synthesizer consumed 4.5 µW to generate 31.25 kHz CSS packets with a spreading factor of 12 and a 3 MHz offset.

The backscatter switch network took the eight phases of the clock (e.g., four time shifted versions and their complements) and mapped the eight phases to RF switches corresponding to their respective impedance values. The switches were implemented using NMOS transistors that toggled the antenna between eight discrete impedance states provided by resistors and capacitors. The impedances were limited to only resistors and capacitors since inductors consume huge area and were undesirably expensive in this implementation. This results in a more constraint constellation map and 3 dB loss in backscattered signal but was a reasonable compromise in this implementation for low cost. During active operation, the backscatter switch network consumed 3.5 µW to backscatter CSS modulated packets at 3 MHz offset. In total, the IC consumed 9.25 µW.

From the foregoing it will be appreciated that, although specific embodiments have been described herein for purposes of illustration, various modifications may be made while remaining with the scope of the claimed technology.

What is claimed is:

1. A backscatter device comprising:
    an antenna configured to backscatter a carrier signal having a first frequency;
    baseband circuitry configured to provide a frequency plan for chirp spread spectrum symbols for transmission;
    a frequency synthesizer coupled to the baseband circuitry and configured to provide an output signal in accordance with the frequency plan; and
    a switch coupled to the antenna, the switch configured to control an impedance of the backscatter device to backscatter the carrier signal in accordance with the output signal such that the first frequency is mixed with the output signal to transmit a chirp spread spectrum signal comprising the chirp spread spectrum symbols.

2. The backscatter device of claim 1, wherein the output signal comprises a square wave having a frequency changing over me in accordance with the frequency plan.

3. The backscatter device of claim 1, wherein the frequency synthesizer comprises a variable oscillator.

4. The backscatter device of claim 3, wherein the variable oscillator comprises a voltage controlled oscillator.

5. The backscatter device of claim 4, further comprising a digital to analog converter coupled to the baseband circuitry and the voltage controlled oscillator, the digital to analog converter configured to translate the frequency plan to analog voltages and provide the analog voltages to the voltage controlled oscillator.

6. The backscatter device of claim 5, wherein the digital to analog converter comprises a bit resolution corresponding to a spreading factor used by the backscatter device.

7. The backscatter device of claim 1, wherein the frequency synthesizer comprises a direct digital synthesizer.

8. The backscatter device of claim 1, wherein the switch is configured to switch between eight impedance values of the backscatter device.

9. The backscatter device of claim 8, wherein the switch is configured to backscatter the carrier signal such that a third harmonic of the chirp spread spectrum signal is suppressed.

10. The backscatter device of claim 1, wherein the chirp spread spectrum signal is arranged in accordance with a LoRa protocol.

11. The backscatter device of claim 1, wherein one of the chirp spread spectrum symbols comprises a signal having a linearly increasing frequency, and wherein another of the chirp spread spectrum symbols comprises a shifted version of the signal.

12. The backscatter device of claim 1, wherein the carrier signal comprises a spread spectrum signal, a frequency hopping signal, a single tone signal, or combinations thereof.

13. A backscatter device comprising:
    an antenna configured to backscatter a carrier signal having a first frequency;
    baseband circuitry configured to provide data for transmission;
    a modulator coupled to the baseband circuitry and configured to provide an output signal in accordance with the data; and
    a switch coupled to the antenna, the switch configured to control an impedance of the backscatter device to backscatter the carrier signal in accordance with the output signal such that the first frequency is mixed with the output signal to transmit a backscattered signal, wherein the backscattered signal has suppressed third and fifth harmonic components.

14. The backscatter device of claim 13, wherein the switch is configured to switch between eight impedance values of the backscatter device.

15. The backscatter device of claim 13, wherein the modulator is configured to perform amplitude modulation, phase modulation, frequency modulation, or combinations thereof.

16. The backscatter device of claim 13, wherein the data for transmission comprises chirp spread spectrum symbols and wherein the backscattered signal comprises a chirp spread spectrum signal.

17. A system comprising:
    a carrier signal generator configured to provide a carrier signal having a first frequency;
    a backscatter device positioned to backscatter the carrier signal to provide a backscattered signal comprising a chirp spread spectrum signal, wherein the backscatter device comprises a switch coupled to an antenna, the switch configured to control an impedance of the backscatter device to backscatter the carrier signal in accordance with an output signal from a frequency synthesizer, such that the first frequency is mixed with the output signal to provide the chirp spread spectrum signal; and
    a receiver configured to receive the chirp spread spectrum signal.

18. The system of claim 17, wherein the backscatter device and the receiver are separated by greater than 100 meters.

19. The system of claim 17, wherein the backscatter device comprises a dermal patch or a contact lens.

20. The system of claim 17, wherein the carrier signal generator and the receiver are integrated into a same hybrid device.

21. The system of claim 20, wherein the same hybrid device is configured to implement full duplex communication.

22. The system of claim 17, further comprising a plurality of backscatter devices, wherein each of the plurality of backscatter devices is configured to backscatter the carrier signal into a respective different channel.

* * * * *